(12) United States Patent
Fan et al.

(10) Patent No.: US 11,984,989 B2
(45) Date of Patent: May 14, 2024

(54) TRANSMISSION METHOD AND APPARATUS

(71) Applicant: HUAWEI TECHNOLOGIES CO., LTD., Shenzhen (CN)

(72) Inventors: Qiang Fan, Hefei (CN); Jun Wang, Shanghai (CA); Mingzeng Dai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 441 days.

(21) Appl. No.: 17/243,859

(22) Filed: Apr. 29, 2021

(65) Prior Publication Data

US 2021/0250131 A1 Aug. 12, 2021

Related U.S. Application Data

(63) Continuation of application No. PCT/CN2019/114421, filed on Oct. 30, 2019.

(30) Foreign Application Priority Data

Nov. 2, 2018 (CN) .......................... 201811302615.4

(51) Int. Cl.
*H04L 1/1812* (2023.01)
*H04L 5/00* (2006.01)
*H04W 72/20* (2023.01)

(52) U.S. Cl.
CPC .......... *H04L 1/1816* (2013.01); *H04L 5/0055* (2013.01); *H04W 72/20* (2023.01)

(58) Field of Classification Search
CPC ... H04L 1/1812; H04L 1/1816; H04L 1/1819; H04L 5/0053; H04L 5/0055;
(Continued)

(56) References Cited

U.S. PATENT DOCUMENTS

2013/0153298 A1* 6/2013 Pietraski ............... H04L 5/0062
175/45
2013/0223356 A1 8/2013 Khoshnevis et al.
(Continued)

FOREIGN PATENT DOCUMENTS

CN 101345608 A 1/2009
CN 105991247 A 10/2016
(Continued)

OTHER PUBLICATIONS

European Search Report issued in corresponding European Application No. 19879866.2, dated Nov. 11, 2021, pp. 1-16.
(Continued)

*Primary Examiner* — Matthew W Genack
(74) *Attorney, Agent, or Firm* — HAUPTMAN HAM, LLP

(57) ABSTRACT

A method includes: a first terminal device obtains information about a first sidelink transmission unit, the first terminal device transmits the data packet via the first SL transmission unit through a hybrid automatic repeat request process corresponding to a unicast connection or a groupcast communication group, when the data packet fails to be transmitted, the first terminal device obtains information about a second SL transmission unit, retransmits the data packet via the second SL transmission unit.

12 Claims, 7 Drawing Sheets

(58) Field of Classification Search
CPC ..... H04W 72/20; H04W 72/72; H04W 72/21; H04W 72/23; H04W 72/25; H04W 72/40
See application file for complete search history.

(56) References Cited

U.S. PATENT DOCUMENTS

| | | | |
|---|---|---|---|
| 2018/0091263 A1 | 3/2018 | Li et al. | |
| 2019/0044667 A1* | 2/2019 | Guo | H04L 1/1816 |
| 2020/0092692 A1 | 3/2020 | Wang et al. | |
| 2020/0107170 A1* | 4/2020 | Chen | H04W 72/23 |

FOREIGN PATENT DOCUMENTS

| | | |
|---|---|---|
| CN | 107645710 A | 1/2018 |
| CN | 108347313 A | 7/2018 |
| WO | 2017127245 A1 | 7/2017 |
| WO | 2018059282 A1 | 4/2018 |
| WO | 2018077425 A1 | 5/2018 |
| WO | 2018123950 A1 | 7/2018 |
| WO | 2018171540 A1 | 9/2018 |

OTHER PUBLICATIONS

3GPP TS 38.321 V15.3.0 (Sep. 2018), 3rd Generation Partnership Project; Technical Specification Group Radio Access Network; NR; Medium Access Control (MAC) protocol specification(Release 15), 76 pages.

3GPP TS 38.213 V15.3.0 (Sep. 2018), 3rd Generation Partnership Project; Technical Specification Group Radio Access Network; NR; Physical layer procedures for control(Release 15), 101 pages.

3GPP TS 38.214 V15.3.0 (Sep. 2018), 3rd Generation Partnership Project; Technical Specification Group Radio Access Network; NR; Physical layer procedures for data (Release 15), 96 pages.

3GPP TS 38.212 V15.3.0 (Sep. 2018), 3rd Generation Partnership Project; Technical Specification Group Radio Access Network; NR; Multiplexing and channel coding(Release 15), 99 pages.

Chinese Office Action issued in corresponding Chinese Application No. 201811302615.4, dated Sep. 24, 2020, pp. 1-71.

International Search Report issued in corresponding International Application No. PCT/CN2019/114421, dated Jan. 17, 2020, pp. 1-9.

* cited by examiner

TRANSMISSION METHOD AND APPARATUS

CROSS-REFERENCE TO RELATED APPLICATIONS

This application is a continuation of International Application No. PCT/CN2019/114421, filed on Oct. 30, 2019, which claims priority to Chinese Patent Application No. 201811302615.4, filed on Nov. 2, 2018, The disclosures of the aforementioned applications are hereby incorporated by reference in their entireties.

TECHNICAL FIELD

This application relates to communications technologies, and in particular, to a transmission method and apparatus.

BACKGROUND

A vehicle-to-everything (vehicle-to-everything, V2X) technology implements communication between a vehicle and the external. The V2X includes a vehicle-to-infrastructure (vehicle-to-infrastructure, V2I) service, a vehicle-to-network (vehicle-to-network, V2N) service, a vehicle-to-pedestrian (vehicle-to-pedestrian, V2P) service, and a vehicle-to-vehicle (vehicle-to-vehicle, V2V) service. For V2X based on a long term evolution (long term evolution, LTE) network, there are two types of communications interfaces: Uu and PC5. The Uu interface is used for communication between a terminal device and a resource scheduling device. The PC5 interface is used for sidelink (sidelink, SL) communication between terminals. The foregoing two communications interfaces may be both used to transmit V2X data.

For the V2X based on the LTE network, two resource allocation modes are defined: Mode-3 (mode-3) and Mode-4 (mode-4). In Mode-3, when a terminal device has SL data to be transmitted, a base station allocates an SL transmission resource to the terminal device from a resource pool through scheduling. In Mode-4, when a terminal device has SL data to be transmitted, the terminal device selects an SL transmission resource from a resource pool based on a requirement. To ensure reliability of SL transmission, existing SL transmission supports blind retransmission at a medium access control (medium access control, MAC) layer. When it is determined that a quantity of times of blind retransmission is 1, the blind retransmission is performed regardless of whether initial transmission succeeds. In both Mode-3 and Mode-4, when the terminal device obtains a transmission resource of a medium access control protocol data unit (medium access control protocol data unit, MAC PDU), a time-frequency resource used for initial transmission and retransmission of the MAC PDU is uniquely determined.

In a new radio (new radio, NR) network, the V2X needs to support data transmission of a highly reliable service, for example, ensure transmission reliability up to 99.999% for each data packet. In a conventional technology, reliability of each data packet cannot be ensured only based on the blind retransmission.

SUMMARY

This application provides a transmission method and apparatus. A HARQ feedback retransmission mechanism and a corresponding resource allocation method are introduced into SL transmission, to improve reliability of a data packet in the SL transmission.

A first aspect of this application provides a transmission method. The transmission method is applied to a first terminal device and includes: The first terminal device obtains information about N SL transmission units. The N SL transmission units are used on an SL for sending a to-be-transmitted data packet of a unicast connection or a groupcast communication group. The SL is a wireless communication link between the first terminal device and a second terminal device. Herein, N is an integer greater than or equal to 1. The first terminal device transmits the data packet by using an unused SL transmission unit in the N SL transmission units through a HARQ process used for the unicast connection or the groupcast communication group.

When the first terminal device has not received a HARQ feedback result or a received HARQ feedback result indicates that the data packet fails to be transmitted, the first terminal device transmits the data packet by using a next unused SL transmission unit in the N SL transmission units.

Based on a HARQ feedback retransmission mechanism, high reliability of SL transmission can be ensured.

In an example, that the first terminal device obtains the information about the N SL transmission units includes:

The first terminal device receives downlink control information DCI sent by a resource scheduling device. The DCI includes the information about the N SL transmission units. The information about the N SL transmission units includes identification information of a carrier on which the N SL transmission units are located and information about a time-frequency resource occupied by the N SL transmission units.

The resource scheduling device schedules a plurality of SL transmission units for a terminal device at a time, to avoid a relatively long delay and a waste of request resources that are caused when the terminal device requests a resource from the resource scheduling device during each time of retransmission.

In another example, that the first terminal device obtains the information about the N SL transmission units includes:

The first terminal device determines the information about the N SL transmission units in a resource pool preconfigured by a resource scheduling device. The information about the N SL transmission units includes identification information of a carrier on which the N SL transmission units are located and information about a time-frequency resource occupied by the N SL transmission units.

The resource pool is preconfigured for the terminal device, to reduce a relatively long delay and a waste of request resources that are caused when the terminal device requests a resource from the resource scheduling device.

In an example, the DCI further includes any one or more of the following information: a communication type, an identifier of the HARQ process, and an identifier of a bandwidth part. The communication type is a unicast communication type or a groupcast communication type.

In an example, the transmission method further includes: The first terminal device determines the unicast connection or the groupcast communication group in a unicast connection or groupcast communication group that has a to-be-transmitted data packet and that implements transmission on the carrier on which the N SL transmission units are located.

Based on the identifier that is of the HARQ process and that is included in the DCI, the first terminal device determines, in a group of HARQ processes corresponding to the unicast connection or the groupcast communication group on the SL carrier on which the N SL transmission units are located, the HARQ process used for the unicast connection or the groupcast communication group.

A second aspect of this application provides a transmission method. The transmission method is applied to a first terminal device and includes: The first terminal device obtains information about a first sidelink SL transmission unit. The first SL transmission unit is used on an SL for sending a to-be-transmitted data packet of a unicast connection or a groupcast communication group. The SL is a wireless communication link between the first terminal device and a second terminal device.

The first terminal device transmits the data packet by using the first SL transmission unit through a hybrid automatic repeat request HARQ process corresponding to the unicast connection or the groupcast communication group.

When the data packet fails to be transmitted, the first terminal device obtains information about a second SL transmission unit.

The first terminal device retransmits the data packet by using the second SL transmission unit.

Based on a HARQ feedback retransmission mechanism, high reliability of SL transmission can be ensured. The terminal device obtains a retransmission resource only when retransmission is determined, to avoid a waste of resources.

In an example, that the first terminal device obtains the information about the first SL transmission unit includes:

The first terminal device receives first downlink control information DCI sent by a resource scheduling device. The first DCI includes the information about the first SL transmission unit. The information about the first SL transmission unit includes identification information of a carrier on which the first SL transmission unit is located and information about a time-frequency resource occupied by the first SL transmission unit.

When the data packet fails to be transmitted, that the first terminal device obtains the information about the second SL transmission unit includes:

The first terminal device receives second DCI sent by the resource scheduling device. The second DCI includes the information about the second SL transmission unit. The information about the second SL transmission unit includes identification information of a carrier on which the second SL transmission unit is located and information about a time-frequency resource occupied by the second SL transmission unit. The second SL transmission unit is allocated by the resource scheduling device based on a HARQ feedback result reported by the first terminal device or the second terminal device.

In another example, that the first terminal device obtains the information about the first SL transmission unit or the information about the second SL transmission unit includes:

The first terminal device determines the information about the first SL transmission unit or the information about the second SL transmission unit in a resource pool preconfigured by a resource scheduling device. The information about the first SL transmission unit includes identification information of a carrier on which the first SL transmission unit is located and information about a time-frequency resource occupied by the first SL transmission unit. The information about the second SL transmission unit includes identification information of a carrier on which the second SL transmission unit is located and information about a time-frequency resource occupied by the second SL transmission unit.

In an example, the first DCI further includes at least one of the following information: information about a communication type, an identifier of the HARQ process, and an identifier of a bandwidth part. The communication type is a unicast communication type or a groupcast communication type.

In an example, the transmission method further includes: The first terminal device determines the unicast connection or the groupcast communication group in a unicast connection or groupcast communication group that has a to-be-transmitted data packet and that implements transmission on the carrier on which the first SL transmission unit is located.

Based on the identifier that is of the HARQ process and that is included in the first DCI, the first terminal device determines, in a group of HARQ processes corresponding to the unicast connection or the groupcast communication group on the SL carrier on which the first SL transmission unit is located, the HARQ process used for the unicast connection or the groupcast communication group.

A third aspect of this application provides a transmission method, including: A resource scheduling device sends information about N sidelink SL transmission units to a first terminal device. The N SL transmission units are used on an SL for sending a to-be-transmitted data packet of a unicast connection or a groupcast communication group. The SL is a wireless communication link between the first terminal device and a second terminal device. Herein, N is an integer greater than or equal to 1.

The resource scheduling device receives a HARQ feedback result sent by the first terminal device or the second terminal device.

In an example, that the resource scheduling device sends the information about the N sidelink SL transmission units to the first terminal device includes:

The resource scheduling device sends downlink control information DCI to the first terminal device. The DCI includes the information about the N SL transmission units. The information about the N SL transmission units includes identification information of a carrier on which the N SL transmission units are located and information about a time-frequency resource occupied by the N SL transmission units.

A fourth aspect of this application provides a transmission method. The transmission method is applied to a second terminal device and includes:

The second terminal device receives a data packet and SCI. The SCI includes one or more of the following information: a communication type, and an identifier of a unicast connection or an identifier of a groupcast communication group.

The second terminal device determines, based on the communication type and/or the identifier of the unicast connection or the identifier of the groupcast communication group, a unicast connection or groupcast communication group corresponding to this time of transmission. The communication type is a unicast communication type or a groupcast communication type.

The second terminal device decodes the data packet through a hybrid automatic repeat request HARQ process used for the unicast connection or groupcast communication group corresponding to this time of transmission.

The second terminal device sends a HARQ feedback result to a first terminal device or a resource scheduling device based on a decoding result. Data is transmitted between the first terminal device and the second terminal device via a sidelink.

In an example, the SCI further includes an identifier of the HARQ process, an identifier of the first terminal device, and identification information of an SL carrier carrying the data packet. Before the second terminal device decodes the data packet by using the HARQ process used for the unicast connection or groupcast communication group corresponding to this time of transmission, the method further includes:

Based on the identifier of the HARQ process, the identifier of the first terminal device, the identifier of the unicast connection, or the identifier of the groupcast communication group included in the SCI, the second terminal device determines, in a group of HARQ processes corresponding to the unicast connection or groupcast communication group corresponding to this time of transmission on the SL carrier carrying the data packet, the HARQ process used for the unicast connection or groupcast communication group corresponding to this time of transmission.

A fifth aspect of this application provides a transmission apparatus. The transmission apparatus is applied to a first terminal device and includes an obtaining module and a sending module. The obtaining module is configured to obtain information about N sidelink SL transmission units. The N SL transmission units are used on an SL for sending a to-be-transmitted data packet of a unicast connection or a groupcast communication group. The SL is a wireless communication link between the first terminal device and a second terminal device. Herein, N is an integer greater than or equal to 1.

The sending module is configured to transmit the data packet by using an unused SL transmission unit in the N SL transmission units through a hybrid automatic repeat request HARQ process used for the unicast connection or the groupcast communication group.

The sending module is further configured to: when the first terminal device has not received a HARQ feedback result or a received HARQ feedback result indicates that the data packet fails to be transmitted, transmit the data packet by using a next unused SL transmission unit in the N SL transmission units.

In an example, the obtaining module is specifically configured to:

receive downlink control information DCI sent by a resource scheduling device, where the DCI includes the information about the N SL transmission units, and the information about the N SL transmission units includes identification information of a carrier on which the N SL transmission units are located and information about a time-frequency resource occupied by the N SL transmission units.

In another example, the obtaining module is specifically configured to:

determine the information about the N SL transmission units in a resource pool preconfigured by a resource scheduling device, where the information about the N SL transmission units includes identification information of a carrier on which the N SL transmission units are located and information about a time-frequency resource occupied by the N SL transmission units.

In an example, the DCI further includes any one or more of the following information: a communication type, an identifier of the HARQ process, and an identifier of a bandwidth part. The communication type is a unicast communication type or a groupcast communication type.

In an example, the transmission apparatus further includes a first determining module and a second determining module. The first determining module is configured to determine the unicast connection or the groupcast communication group in a unicast connection or groupcast communication group that has a to-be-transmitted data packet and that implements transmission on the carrier on which the N SL transmission units are located.

The second determining module is configured to: based on the identifier that is of the HARQ process and that is included in the DCI, determine, in a group of HARQ processes corresponding to the unicast connection or the groupcast communication group on the SL carrier on which the N SL transmission units are located, the HARQ process used for the unicast connection or the groupcast communication group.

A sixth aspect of this application provides a transmission apparatus. The transmission apparatus is applied to a first terminal device and includes an obtaining module and a sending module. The obtaining module is configured to obtain information about a first sidelink SL transmission unit. The first SL transmission unit is used on an SL for sending a to-be-transmitted data packet of a unicast connection or a groupcast communication group. The SL is a wireless communication link between the first terminal device and a second terminal device.

The sending module is configured to transmit the data packet by using the first SL transmission unit through a hybrid automatic repeat request HARQ process corresponding to the unicast connection or the groupcast communication group. The obtaining module is further configured to: when the data packet fails to be transmitted, obtain information about a second SL transmission unit.

The sending module is further configured to retransmit the data packet by using the second SL transmission unit.

In an example, the obtaining module is specifically configured to:

receive first downlink control information DCI sent by a resource scheduling device, where the first DCI includes the information about the first SL transmission unit, and the information about the first SL transmission unit includes identification information of a carrier on which the first SL transmission unit is located and information about a time-frequency resource occupied by the first SL transmission unit; and receive second DCI sent by the resource scheduling device, where the second DCI includes the information about the second SL transmission unit, the information about the second SL transmission unit includes identification information of a carrier on which the second SL transmission unit is located and information about a time-frequency resource occupied by the second SL transmission unit, and the second SL transmission unit is allocated by the resource scheduling device based on a HARQ feedback result reported by the first terminal device or the second terminal device.

In another example, the obtaining module is specifically configured to:

determine the information about the first SL transmission unit or the information about the second SL transmission unit in a resource pool preconfigured by a resource scheduling device, where the information about the first SL transmission unit includes identification information of a carrier on which the first SL transmission unit is located and information about a time-frequency resource occupied by the first SL transmission unit, and the information about the second SL transmission unit includes identification information of a carrier on which the second SL transmission unit is located and information about a time-frequency resource occupied by the second SL transmission unit.

In an example, the first DCI further includes at least one of the following information: information about a communication type, an identifier of the HARQ process, and an identifier of a bandwidth part. The communication type is a unicast communication type or a groupcast communication type.

In an example, the transmission apparatus further includes a first determining module and a second determining module. The first determining module is configured to determine the unicast connection or the groupcast communication group in a unicast connection or groupcast communication group that has a to-be-transmitted data packet and that implements transmission on the carrier on which the first SL transmission unit is located.

The second determining module is configured to: based on the identifier that is of the HARQ process and that is included in the first DCI, determine, in a group of HARQ processes corresponding to the unicast connection or the groupcast communication group on the SL carrier on which the first SL transmission unit is located, the HARQ process used for the unicast connection or the groupcast communication group.

A seventh aspect of this application provides a transmission apparatus. The transmission apparatus is applied to a resource scheduling device and includes a sending module and a receiving module. The sending module is configured to send information about N sidelink SL transmission units to a first terminal device. The N SL transmission units are used on an SL for sending a to-be-transmitted data packet of a unicast connection or a groupcast communication group. The SL is a wireless communication link between the first terminal device and a second terminal device. Herein, N is an integer greater than or equal to 1.

The receiving module is configured to receive a HARQ feedback result sent by the first terminal device or the second terminal device.

In an example, the sending module is specifically configured to:

send downlink control information DCI to the first terminal device, where the DCI includes the information about the N SL transmission units, and the information about the N SL transmission units includes identification information of a carrier on which the N SL transmission units are located and information about a time-frequency resource occupied by the N SL transmission units.

An eighth aspect of this application provides a transmission apparatus. The transmission apparatus is applied to a second terminal device and includes a receiving module, a first determining module, a decoding module, and a sending module. The receiving module is configured to receive a data packet and sidelink control information SCI. The SCI includes one or more of the following information: a communication type, and an identifier of a unicast connection or an identifier of a groupcast communication group.

The first determining module is configured to determine, based on the communication type and/or the identifier of the unicast connection or the identifier of the groupcast communication group, a unicast connection or groupcast communication group corresponding to this time of transmission. The communication type is a unicast communication type or a groupcast communication type.

The decoding module is configured to decode the data packet through a hybrid automatic repeat request HARQ process used for the unicast connection or groupcast communication group corresponding to this time of transmission.

The sending module is configured to send a HARQ feedback result to a first terminal device or a resource scheduling device based on a decoding result. Data is transmitted between the first terminal device and the second terminal device via a sidelink.

In an example, the SCI further includes an identifier of the HARQ process, an identifier of the first terminal device, and identification information of an SL carrier carrying the data packet. The transmission apparatus further includes a second determining module.

The second determining module is configured to: based on the identifier of the HARQ process, the identifier of the first terminal device, the identifier of the unicast connection, or the identifier of the groupcast communication group included in the SCI, determine, in a group of HARQ processes corresponding to the unicast connection or groupcast communication group corresponding to this time of transmission on the SL carrier carrying the data packet, the HARQ process used for the unicast connection or groupcast communication group corresponding to this time of transmission.

In the first aspect to the third aspect and the fourth aspect to the seventh aspect of this application, a plurality of groups of HARQ processes are set on an SL carrier on which an SL transmission unit is located, and each group of HARQ processes in the plurality of groups of HARQ processes can be used for data transmission of only one unicast connection or groupcast communication group. Alternatively, a group of shared unicast HARQ processes or groupcast HARQ processes are set on an SL carrier on which an SL transmission unit is located, the shared unicast HARQ processes can be used for data transmission of all unicast connections on the SL carrier on which the SL transmission unit is located, and the shared groupcast HARQ processes can be used for data transmission of all groupcast communication groups on the SL carrier on which the SL transmission unit is located.

In an example, the SCI of the data packet carries indication information, and the indication information is used to indicate the second terminal device to perform a HARQ feedback.

The indication information is a communication type. The communication type is a unicast communication type or a groupcast communication type.

Alternatively, the indication information is an identifier of the second terminal device or an identifier of the groupcast communication group.

Alternatively, the indication information is a value of a HARQ feedback field of at least one bit, and the value of the HARQ feedback field is used to indicate whether to perform the HARQ feedback.

In an example, the SCI of the data packet further includes any one or more of the following information: information about a resource used for the HARQ feedback result, initial transmission indication information or retransmission indication information, a redundancy version of the data packet, information about a carrier carrying the data packet, information about a bandwidth part BWP carrying the data packet, an identifier of the HARQ process used for the unicast connection or the groupcast communication group, the information about the N SL transmission units, the identifier of the unicast connection or the identifier of the groupcast communication group, the information about the communication type, and the identifier of the first terminal device.

In the fourth aspect or the eighth aspect of this application, a plurality of groups of HARQ processes are set on the SL carrier carrying the data packet, and each group of HARQ processes in the plurality of groups of HARQ processes can be used for data transmission of only one unicast connection or groupcast communication group. Alternatively, a group of shared unicast HARQ processes or groupcast HARQ processes are set on the SL carrier carrying the data packet, the shared unicast HARQ processes can be used for data transmission of all unicast connections on the SL carrier carrying the data packet, and the shared groupcast HARQ processes can be used for data transmission of all groupcast communication groups on the SL carrier carrying the data packet.

A ninth aspect of this application provides a terminal device, including a processor, a memory, and a transceiver. The memory is configured to store instructions. The transceiver is configured to communicate with another device. The processor is configured to execute the instructions stored in the memory, so that the terminal device performs the method according to any one of the first aspect, the second aspect, the fourth aspect, the fifth aspect, the sixth aspect, and the eighth aspect of this application.

A tenth aspect of this application provides a resource scheduling device, including a processor, a memory, and a transceiver. The memory is configured to store instructions. The transceiver is configured to communicate with another device. The processor is configured to execute the instructions stored in the memory, so that the resource scheduling device performs the method according to the third aspect or the seventh aspect.

For example, the resource scheduling device provided in this embodiment of this application or the transmission apparatus applied to the resource scheduling device may be a base station or a node in a radio access network, or may be another network device on a network side that provides a service for a terminal device.

An eleventh aspect of this application provides a computer-readable storage medium. The computer-readable storage medium stores instructions. When the instructions are executed, a computer is enabled to perform the method according to any one of the first aspect, the second aspect, the fourth aspect, the fifth aspect, the sixth aspect, and the eighth aspect of this application.

A twelfth aspect of this application provides a computer-readable storage medium. The computer-readable storage medium stores instructions. When the instructions are executed, a computer is enabled to perform the method according to the third aspect or the seventh aspect.

A thirteenth aspect of this application provides a computer program product applied to a terminal device. The computer program product includes instructions. When the instructions are executed by a computing apparatus, the terminal device is enabled to perform the method according to any one of the first aspect, the second aspect, the fourth aspect, the fifth aspect, the sixth aspect, and the eighth aspect of this application.

A fourteenth aspect of this application provides a computer program product applied to a resource scheduling device. The computer program product includes instructions. When the instructions are executed by a computing apparatus, the resource scheduling device is enabled to perform the method according to the third aspect or the seventh aspect of this application.

A fifteenth aspect of this application provides a system-on-a-chip or a system chip. The system-on-a-chip or the system chip may be applied to a terminal device. The system-on-a-chip or the system chip includes: at least one communications interface, at least one processor, and at least one memory. The communications interface, the memory, and the processor are interconnected by using a bus. The processor executes instructions stored in the memory, so that the terminal device can perform the method according to any one of the first aspect, the second aspect, the fourth aspect, the fifth aspect, the sixth aspect, and the eighth aspect of this application.

A sixteenth aspect of this application provides a system-on-a-chip or a system chip. The system-on-a-chip or the system chip may be applied to a resource scheduling device. The system-on-a-chip or the system chip includes: at least one communications interface, at least one processor, and at least one memory. The communications interface, the memory, and the processor are interconnected by using a bus. The processor executes instructions stored in the memory, so that the resource scheduling device performs the method according to the third aspect or the seventh aspect of this application.

A seventeenth aspect of this application provides a communications system. The communications system includes any one or more of the foregoing first terminal device, the second terminal device, and the resource scheduling device.

According to the transmission method and apparatus provided in this application, the method includes: The first terminal device obtains the information about the N SL transmission units. The N SL transmission units are used on the SL for sending the data packet of the unicast connection or the groupcast communication group. The first terminal device transmits the data packet to the second terminal device by using the unused SL transmission unit in the N SL transmission units through the HARQ process used for the unicast connection or the groupcast communication group. The second terminal device sends the HARQ feedback result to the first terminal device based on the decoding result. When the first terminal device has not received the HARQ feedback result or the received HARQ feedback result indicates that the data packet fails to be transmitted, the first terminal device retransmits the data packet by using the next unused SL transmission unit in the N SL transmission units. A HARQ feedback retransmission mechanism and a corresponding resource allocation method are introduced into SL transmission, to improve reliability of a data packet in the SL transmission.

DESCRIPTION OF EMBODIMENTS

Figure 1:
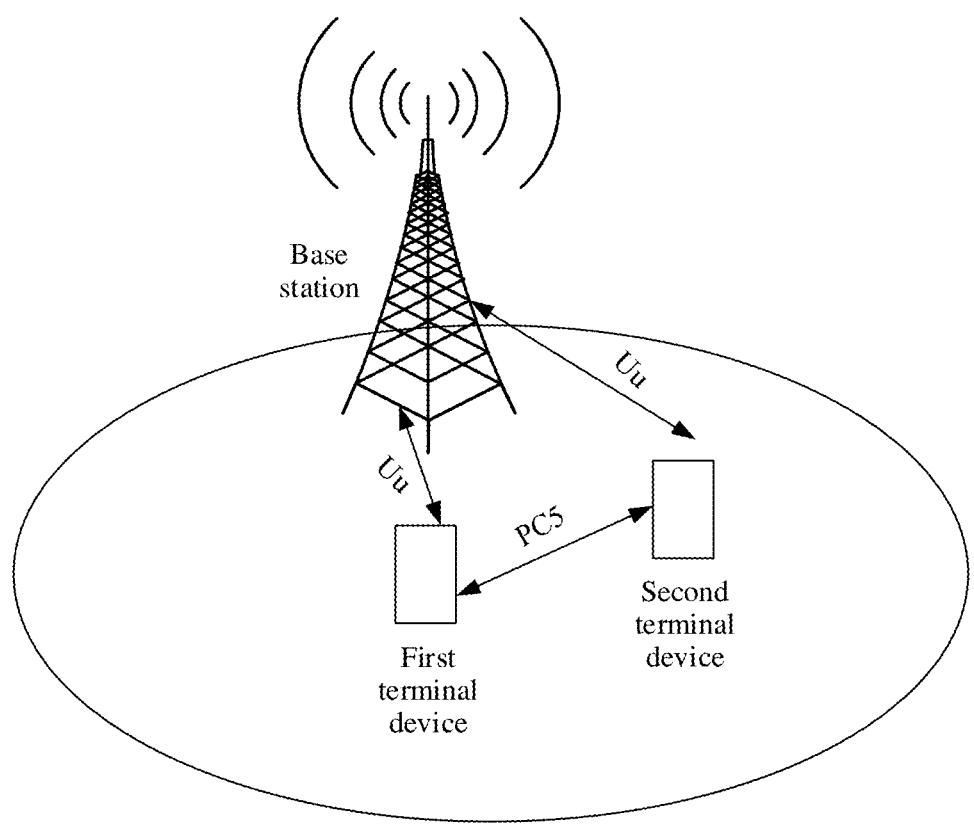
FIG. 1 is a schematic diagram of a network architecture applicable to this application.
Figure 2:
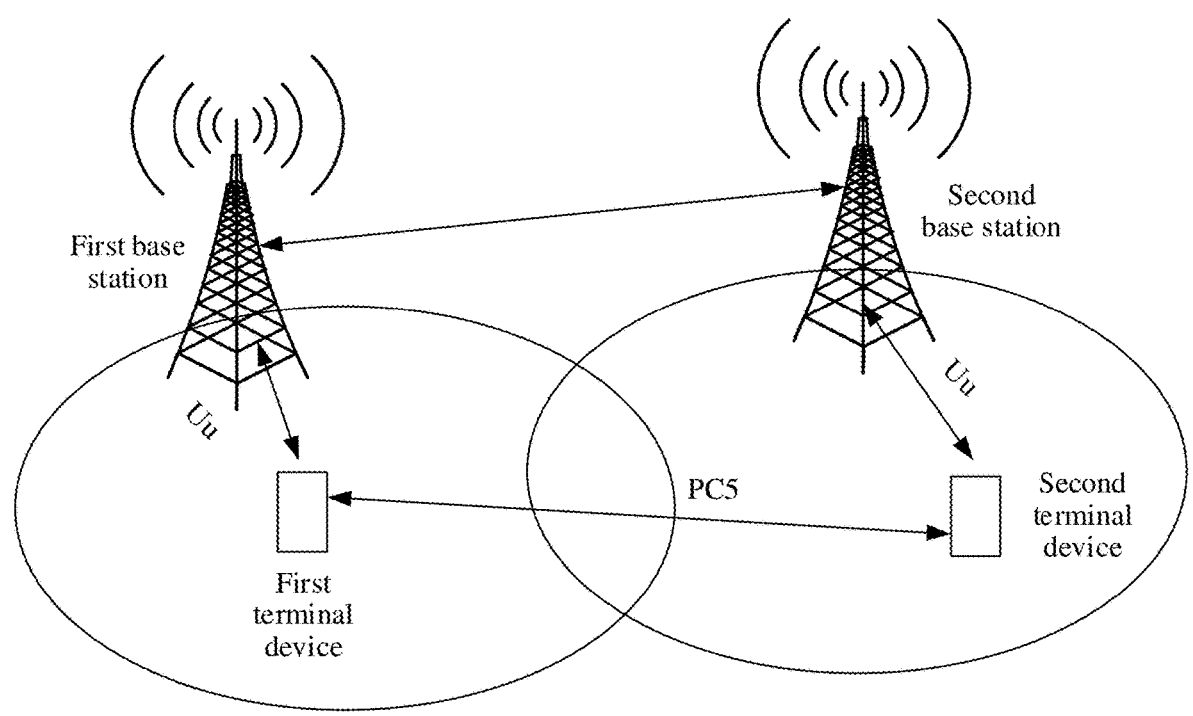
FIG. 2 is a schematic diagram of another network architecture applicable to this application.

FIG. 1 is a schematic diagram of a network architecture applicable to this application. The network architecture includes a base station and two terminal devices: a first terminal device and a second terminal device. The first terminal device and the second terminal device are located within coverage of the same base station. FIG. 2 is a schematic diagram of another network architecture applicable to this application. The network architecture includes a first base station, a second base station, a first terminal device, and a second terminal device. The first terminal device is located within coverage of the first base station, and the second terminal device is located within coverage of the second base station. The first base station and the second base station may communicate with each other.

In the foregoing two network architectures, the base station and the terminal device communicate with each other by using a Uu interface, and the terminal devices communicate with each other by using a PC5 interface. Wireless transmission between PC5 interfaces is also referred to as SL transmission. A wireless communication link between the first terminal device and the second terminal device is referred to as an SL. The SL is used for transmitting a V2X service. A data packet sent on the SL may be a data packet of a unicast connection or a groupcast communication group. The unicast connection indicates that both a transmit end and a receive end have only one device. The groupcast communication group indicates that a transmit end is a device and a receive end is a plurality of devices.

The terminal device in this application is also referred to as a terminal (Terminal), user equipment (user equipment, UE), an access terminal, a subscriber unit, a subscriber station, a mobile station, a remote station, a remote terminal, a mobile device, a user terminal, a wireless communication device, a user agent, a user apparatus, or the like. The terminal device may be a station (station, ST) in a wireless local area network (wireless local area network, WLAN), or may be a cellular phone, a cordless phone, a session initiation protocol (session initiation protocol, SIP) phone, a wireless local loop (wireless local loop, WLL) station, a personal digital assistant (personal digital assistant, PDA) device, a handheld device having a wireless communication function, a computing device, another processing device connected to a wireless modem, a vehicle-mounted device, a wearable device, and a terminal device in a next-generation communications system, for example, a terminal device in a fifth-generation (5-generation, 5G) network, a terminal device in a future evolved public land mobile network (public land mobile network, PLMN), a terminal device in a new radio (new radio, NR) communications system, or the like.

The base station may be an access point (access point, AP) in a WLAN, a base transceiver station (base transceiver station, BTS) in a global system for mobile communications (global system for mobile communications, GSM) or a code division multiple access (code division multiple access, CDMA), a nodeB (nodeB, NB) in WCDMA, an evolved nodeB (evolved nodeB, eNB or eNodeB) in LTE, a relay station or an access point, a new generation nodeB (new generation nodeB, gNodeB) in an NR system, or the like. Optionally, the gNodeB may be in a form in which a central unit (central unit, CU) and a distributed unit (distributed unit, DU) are separated from each other. For example, the resource scheduling device in this specification may be a base station.

FIG. 1 and FIG. 2 are merely examples for description instead of limitation. The network architecture may further include more base stations and terminal devices.

In the following, some terms in this application are described and explained, to help a person skilled in the art have a better understanding.

(1) A unit in this application is a functional unit or a logical unit. The unit may be in a form of software, and a function of the unit is implemented by a processor through executing program code. Alternatively, the unit may be in a form of hardware.

(2) "A plurality of" means two or more, and another quantifier is similar to this. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. A range described by using "above", "below", or the like includes boundary points.

(3) Explanation of the same nouns and concepts in the different embodiments of this application may be mutually referenced.

(4) A Mode-3 resource allocation manner related to this application indicates a manner in which a base station schedules a resource for a terminal device, and a Mode-4 resource allocation manner indicates a manner in which a terminal device selects a resource. Certainly, names of the foregoing two resource allocation manners are not limited to Mode-3 and Mode-4, and may alternatively be other names Herein, Mode-3 and Mode-4 are merely used to distinguish between the foregoing two different resource allocation manners, and do not constitute limitation.

(5) A HARQ process (process) related to this application may be referred to as an SL HARQ process. The HARQ process is used for processing a PC5 interface data packet (that is, an SL data packet), and is different from a Uu HARQ process that is used for processing a Uu interface data packet.

(6) A resource pool related to this application indicates a set of time-frequency resources.

In a conventional technology, after a data packet is transmitted on an SL, reliability of a data packet is ensured through one time of blind retransmission. However, for a highly reliable service, only through blind retransmission, it is difficult to ensure reliability of each data packet. Therefore, in a transmission method of this application, a hybrid automatic repeat request (hybrid automatic repeat request, HARQ) feedback retransmission mechanism is introduced in SL transmission. The retransmission mechanism is applicable to the two resource allocation manners: Mode-3 and Mode-4. A HARQ feedback is introduced, thereby improving reliability of a data packet in the SL transmission.

Figure 3:
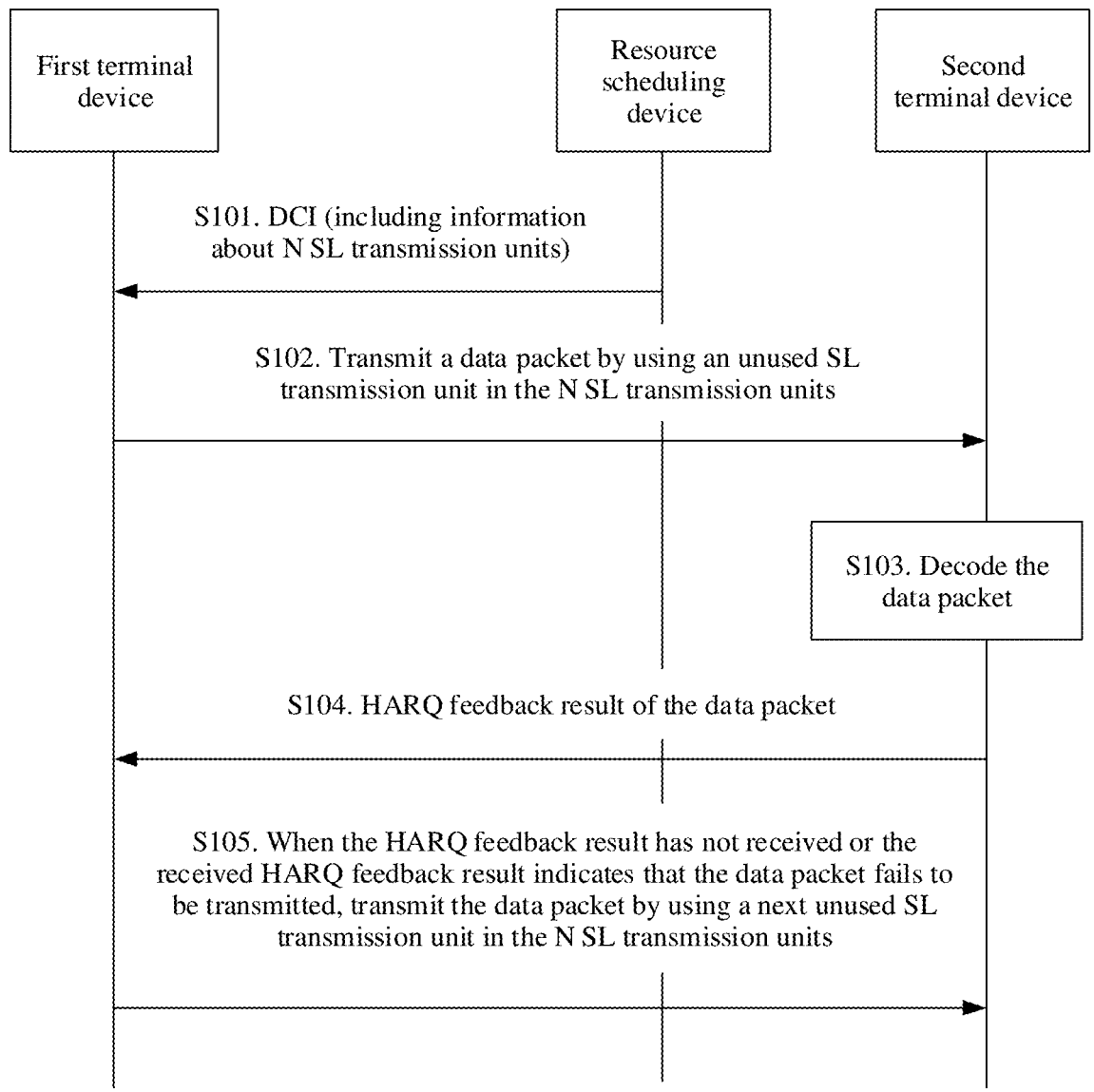
FIG. 3 is a signaling flowchart of a transmission method according to Embodiment 1 of this application.

FIG. 3 is a signaling flowchart of a transmission method according to Embodiment 1 of this application. A Mode-3 resource allocation manner is used in this embodiment. As shown in FIG. 3, the method includes the following steps:

Step S101: A resource scheduling device sends downlink control information (downlink control information, DCI) to a first terminal device. The DCI includes information about N SL transmission units.

For example, when the first terminal device has data to be transmitted, the first terminal device requests a transmission resource from the resource scheduling device, and the resource scheduling device allocates the N SL transmission units to the first terminal device and sends the information about the N SL transmission units to the first terminal device by using the DCI. The N SL transmission units are used on an SL for sending a to-be-transmitted data packet of a unicast connection or a groupcast communication group. The SL is a wireless communication link between the first terminal device and a second terminal device. The first terminal device is a transmit-end device, the second terminal device is a receive-end device, and the resource scheduling device may be a network device, a base station, or a terminal device configured to schedule a resource. When the resource scheduling device is a base station, the first terminal device and the second terminal device may be located within coverage of the same base station, or may be within coverage of different base stations.

Herein, N may be an integer greater than or equal to 1. For example, N may be a parameter predefined in a protocol, or may be a parameter configured in a network. For unicast communication and groupcast communication, values of N may be the same, or may be different. The SL transmission unit is a minimum transmission unit for transmitting a data packet on the SL. The transmission unit may also be referred to as a resource block. Each SL transmission unit can be used to transmit one MAC PDU. The information about the N SL transmission units includes identification information of a carrier on which the N SL transmission units are located and information about a time-frequency resource occupied by the N SL transmission units.

For example, the information about the time-frequency resource occupied by the N SL transmission units may include one or more of the following information: a quantity N of SL transmission units, a frequency domain location occupied by the SL transmission unit, a time domain interval between the SL transmission units, and the like. When N is a parameter predefined in a protocol, N does not need to be carried in the DCI. The N SL transmission units are located on the same carrier. The identification information of the carrier on which the N SL transmission units are located may be an identifier of the carrier or an identifier index of the carrier.

Optionally, the DCI may further include one or more of the following information: information about a communication type, information about a resource used when the second terminal device sends a HARQ feedback result to the first terminal device, an identifier of the HARQ process (HARQ process id), identification information of a bandwidth part (bandwidth part, BWP), identification information of a resource pool, identification information of the unicast connection or identification information of the groupcast communication group, and the like. The communication type is a unicast communication type, a groupcast communication type, or a broadcast communication type. An identifier of the unicast connection may be an identifier of the second terminal device.

For example, the BWP corresponding to an identifier of the BWP belongs to the SL carrier on which the N SL transmission units are located. The SL carrier on which the N SL transmission units are located may be divided into a plurality of BWPs. Each BWP may be divided into a plurality of resource pools. If a BWP is defined on the SL carrier, the information about the N SL transmission units needs to not only include the identification information of the carrier on which the N SL transmission units are located, but also include identification information of a BWP on which the N SL transmission units are located and information about a resource pool.

For example, the communication type may be carried in the DCI, or the communication type may be implicitly indicated in another manner. For example, the resource scheduling device may separately configure different time-frequency resources for unicast communication, groupcast communication, or broadcast communication of the first terminal device; and configure a mapping relationship between a communication type and a carrier/resource pool/BWP. After receiving the DCI, the first terminal device may determine a communication type of this time of transmission based on the carrier/resource pool/BWP to which the N SL transmission units belong. The communication type of this time of transmission may also be considered as a communication type of the N SL transmission units.

Step S102: The first terminal device transmits the data packet by using an unused SL transmission unit in the N SL transmission units through a HARQ process used for the unicast connection or the groupcast communication group.

For example, after receiving the information about the N SL transmission units, the first terminal device delivers the information about the N SL transmission units to a MAC layer. A unicast connection may be established between the first terminal device and a plurality of terminals, or the first terminal device belongs to a plurality of groupcast communication groups. Therefore, the unicast connection or groupcast communication group corresponding to this time of transmission needs to be first determined. The first terminal device may determine, based on the communication type, the unicast connection or groupcast communication group corresponding to this time of transmission in a unicast connection or groupcast communication group that has a to-be-transmitted data packet and that implements transmission on the carrier/BWP/resource pool in which the N SL transmission units are located. For example, the first terminal device may determine the unicast connection or groupcast communication group corresponding to this time of transmission in the following several manners:

(1) Randomly select, as the unicast connection or groupcast communication group corresponding to this time of transmission, a unicast connection or a groupcast communication group in a unicast connection or groupcast communication group that has a to-be-transmitted data packet and that may implement transmission on the carrier/BWP/resource pool in which the N SL transmission units are located.

(2) Select, as the unicast connection or groupcast communication group corresponding to this time of transmission, a unicast connection or a groupcast communication group with a largest to-be-transmitted data volume in a unicast connection or groupcast communication group that has a to-be-transmitted data packet and that may implement transmission on the carrier/BWP/resource pool in which the N SL transmission units are located.

(3) Select, as the unicast connection or groupcast communication group corresponding to this time of transmission, a unicast connection or a groupcast communication group with a highest quality of service (quality of service, QoS) requirement in a unicast connection or groupcast communication group that has a to-be-transmitted data packet and that may implement transmission on the carrier/BWP/resource pool in which the N SL transmission units are located. Herein, the highest QoS requirement may indicate a shortest delay, a highest priority, a highest data rate requirement, a highest reliability requirement, or the like.

(4) When the resource scheduling device adds the identification information of the unicast connection or the identification information of the groupcast communication group into the DCI, the first terminal device determines, based on the identification information that is of the unicast connection or the groupcast communication group and that is indicated in the DCI, the unicast connection or groupcast communication group corresponding to this time of transmission.

Optionally, after determining the unicast connection or groupcast communication group corresponding to this time of transmission, the first terminal device determines, in a group of HARQ processes corresponding to the unicast connection or groupcast communication group corresponding to this time of transmission on the SL carrier on which the N SL transmission units are located, the HARQ process used for the unicast connection or groupcast communication group corresponding to this time of transmission.

In this embodiment, the first terminal device may separately maintain one group of HARQ processes (or one HARQ entity) for a plurality of unicast connections or groupcast communication groups on one SL carrier. Each group of HARQ processes (or each HARQ entity) can be used for processing data transmission of only one specific unicast connection or groupcast communication group. Correspondingly, one unicast connection or one groupcast communication group may correspond to a plurality of available SL carriers. One group of HARQ processes (or one HARQ entity) are maintained for the unicast connection or the groupcast communication group on each available SL carrier. One HARQ entity includes one group of HARQ processes.

Alternatively, the first terminal device maintains one group of shared unicast HARQ processes (or one shared unicast HARQ entity) on one SL carrier, and/or the first terminal device maintains one group of shared groupcast HARQ processes (or one shared groupcast HARQ entity) on one SL carrier. The shared unicast HARQ processes and the shared groupcast HARQ processes may be the same group of HARQ processes, or may be different groups of HARQ processes. The shared unicast HARQ entity and the shared groupcast HARQ entity may also be the same HARQ entity, or may be different HARQ entities. The shared unicast HARQ entity/process is used for processing data transmission of all unicast connections on the SL carrier. The shared groupcast HARQ entity/process is used for processing data transmission of all groupcast communication groups on the SL carrier. Correspondingly, one unicast connection or one groupcast communication group may correspond to a plurality of available SL carriers. One group of shared unicast HARQ processes (or one shared unicast HARQ entity) or one group of shared groupcast HARQ processes (or one shared groupcast HARQ entity) are maintained on each available SL carrier.

For the groupcast communication group, one groupcast communication group includes a plurality of group members. One HARQ entity or one group of HARQ processes may be maintained for the groupcast communication group on one SL carrier, or one HARQ entity or one group of HARQ processes may be separately maintained for each group member in the groupcast communication group on the SL carrier. This is not limited in this embodiment.

For example, the unicast connection or groupcast communication group corresponding to this time of transmission can implement data processing by using a HARQ process maintained for the SL carrier on which the N SL transmission units are located. When a plurality of groups of HARQ processes (or a plurality of HARQ entities) are disposed on the SL carrier on which the N SL transmission units are located, if the DCI includes the identifier of the HARQ process, the first terminal device first determines the communication type; then determines, based on the communication type, the unicast connection or groupcast communication group corresponding to this time of transmission; and based on the identifier that is of the HARQ process and that is included in the DCI, determines, from a group of HARQ process (or a group of HARQ processes included in a HARQ entity) corresponding to the unicast connection or groupcast communication group corresponding to this time of transmission on the SL carrier on which the N SL transmission units are located, the HARQ process corresponding to the identifier that is of the HARQ process and that is included in the DCI, as the HARQ process used for the unicast connection or groupcast communication group corresponding to this time of transmission. If the DCI does not include the identifier of the HARQ process, the first terminal device first determines the communication type; then determines, based on the communication type, the unicast connection or groupcast communication group corresponding to this time of transmission; and selects, from a group of HARQ processes (or a group of HARQ processes included in a HARQ entity) corresponding to the unicast connection or groupcast communication group corresponding to this time of transmission on the SL carrier on which the N SL transmission units are located, an idle HARQ process as the HARQ process used for the unicast connection or groupcast communication group corresponding to this time of transmission. In other words, the HARQ process is associated with the identifier of the unicast connection or the identifier of the groupcast communication group.

When only one group of shared unicast HARQ processes or only one group of shared groupcast HARQ processes are set on the SL carrier on which the N SL transmission units are located, optionally, the terminal may separately maintain one group of shared unicast HARQ processes or one group of shared groupcast HARQ processes for a plurality of different communication types on the SL carrier on which the N SL transmission units are located, or may maintain one group of shared unicast HARQ processes or one group of shared groupcast HARQ processes for each communication type on the SL carrier on which the N SL transmission units are located.

When the terminal may separately maintain one group of shared unicast HARQ processes or one group of shared groupcast HARQ processes for a plurality of different communication types on the SL carrier on which the N SL transmission units are located, the first terminal device first determines the communication type; and then determines, based on the communication type, the group of shared unicast HARQ processes or the group of shared groupcast HARQ processes corresponding to the communication type. If the DCI includes the identifier of the HARQ process, based on the identifier that is of the HARQ process and that is included in the DCI, the first terminal device determines, from the group of shared unicast HARQ processes or the group of shared groupcast HARQ processes corresponding to the communication type, the HARQ process used for this time of transmission for the unicast connection or groupcast communication group corresponding to this time of transmission. If the DCI does not include the identifier of the HARQ process, the first terminal device selects, from the group of shared unicast HARQ processes or the group of shared groupcast HARQ processes corresponding to the communication type, an idle HARQ process as the HARQ process used for the unicast connection or groupcast communication group corresponding to this time of transmission.

When the terminal maintains the group of shared unicast HARQ processes or the group of shared groupcast HARQ processes for each communication type on the SL carrier on which the N SL transmission units are located, if the DCI includes the identifier of the HARQ process, the first terminal device may directly determine, from the shared unicast HARQ processes or the shared groupcast HARQ processes for each communication type, the HARQ process included in the DCI as the HARQ process used in this time of transmission. After determining the HARQ process, the first terminal device determines the unicast connection or groupcast communication group corresponding to this time of transmission. If the DCI does not include the identifier of the HARQ process, the first terminal device selects, from the shared unicast HARQ processes or the shared groupcast HARQ processes of each communication type, an idle HARQ process as the HARQ process used in this time of transmission. After determining the HARQ process, the first terminal device determines the unicast connection or the groupcast communication group corresponding to this time of transmission. For a manner of determining the unicast connection or the groupcast communication group used in this time of transmission, refer to the foregoing four example manners.

When the terminal maintains the group of shared unicast HARQ processes or the group of shared groupcast HARQ processes for each communication type on the SL carrier on which the N SL transmission units are located, the first terminal device may alternatively first determine the communication type; then determine, based on the communication type, the unicast connection or groupcast communication group corresponding to this time of transmission; and determine, based on the identifier that is of the HARQ process and that is indicated in the DCI, the HARQ process used in this time of transmission, or select an idle HARQ process as the HARQ process used in this time of transmission.

In this embodiment, the first terminal device may add, into sidelink control information (Sidelink Control Information, SCI) that is sent by the first terminal device to the second terminal device, the identifier of the HARQ process used for the unicast connection or groupcast communication group corresponding to this time of transmission, so that the second terminal device determines, based on the identifier that is of the HARQ process and that is carried in the SCI, the HARQ process used in this time of transmission. Certainly, the first terminal device may alternatively not send, to the second terminal device, the identifier of the HARQ process used for the unicast connection or groupcast communication group corresponding to this time of transmission, and the second terminal device determines, in another manner, the HARQ process used in this time of transmission. After the first terminal device performs initial transmission or retransmission by using a HARQ process, if the first terminal device receives ACK fed back by the second terminal device, it is considered that the HARQ process is idle.

For example, the N SL transmission units have a sequence. In the initial transmission, the first terminal device selects a first SL transmission unit, generates an SL MAC layer data packet through MAC layer packet assembly, and performs transmission by using the first SL transmission unit. In the retransmission, the first terminal device selects an $M^{th}$ transmission unit to transmit data in a cache associated with a corresponding HARQ process. Herein, 1<M≤N. For one data packet, the first terminal device performs transmission at least once, and performs transmission at most of N times. If the initial transmission succeeds, the retransmission is not performed. If the initial transmission fails, the retransmission is performed. If a time of retransmission succeeds, the retransmission is not performed any more. The retransmission is performed at most of N−1 times. After N−1 times of retransmission, if the transmission still fails, the data packet is not retransmitted any more. It should be noted that the first terminal device processes the data packet in the initial transmission and the retransmission by using the same HARQ process.

Optionally, the SCI of the data packet carries indication information, and the indication information is used to indicate the second terminal device to perform a HARQ feedback. The indication information may be the communication type. Alternatively, the indication information is the identifier of the second terminal device or the identifier of the groupcast communication group. Alternatively, the indication information is a value of a HARQ feedback field of at least one bit, and the value of the HARQ feedback field is used to indicate whether to perform the HARQ feedback. For example, indication is performed by using a 1-bit feedback_indicator field. When feedback_indicator=1, it indicates that the HARQ feedback is required; or when feedback_indicator=0, it indicates that the HARQ feedback is not required.

Optionally, the second terminal device may determine, based on a resource location of receiving the SCI, whether the HARQ feedback needs to be performed. For example, the base station configures the mapping relationship between a communication type and a carrier/resource pool/BWP for the second terminal device. The second terminal device determines, based on the carrier/resource pool/BWP of the received SCI and the foregoing configured mapping relationship, whether the communication type is unicast communication or groupcast communication. In this case, the HARQ feedback needs to be performed.

Optionally, whether the HARQ feedback needs to be performed may alternatively be indicated by using a scrambling manner of the SCI. For example, for the unicast connection, scrambling is performed by using a unicast radio network temporary identifier (radio network temporary identifier, RNTI). For the groupcast communication group, scrambling is performed by using a groupcast RNTI. If the second terminal device successfully scrambles the SCI by using the unicast RNTI or the groupcast RNTI, it is determined that the HARQ feedback needs to be performed on the data packet corresponding to the SCI. The unicast RNTI may be the identifier of the unicast connection, and the groupcast RNTI may be the identifier of the groupcast communication group.

Certainly, it may also be defined in a protocol that the second terminal device performs the HARQ feedback on any received data packet. In this way, the first terminal device does not need to indicate the second terminal device to perform the HARQ feedback.

Optionally, the SCI of the data packet may further include any one or more of the following information: information about a resource used for the HARQ feedback result, initial transmission indication information or retransmission indication information, a redundancy version (redundancy version, RV) of the data packet, information about the carrier carrying the data packet, information about a BWP carrying the data packet, information about a resource pool carrying the data packet, an identifier of the HARQ process used for the unicast connection or the groupcast communication group, the identifier of the unicast connection or the identifier of the groupcast communication group, information about the communication type, and the identification information of the first terminal device. The identifier of the unicast connection may be the identifier of the second terminal device.

Optionally, the information about the resource used for the HARQ feedback result may be implicitly determined based on a location of a time-frequency resource in which the SCI is located. For example, there is a fixed time interval between a time domain location of the resource used for the HARQ feedback result and a time domain location of the SCI, and there is a specific function relationship between a frequency domain location of the resource used for the HARQ feedback result and a frequency domain location of the SCI. Alternatively, the information about the resource used for the HARQ feedback result may be determined based on the location of the time-frequency resource in which the SCI is located, and an index value of UE in the groupcast communication group.

Step S103: The second terminal device decodes the data packet by using the HARQ process used for the unicast connection or groupcast communication group corresponding to this time of transmission.

For example, the second terminal device receives the data packet and the SCI of the data packet, and determines the unicast connection or groupcast communication group corresponding to this time of transmission. The SCI includes one or more of the following information: the communication type, the identifier of the unicast connection or the identifier of the groupcast communication group, and the identifier of the first terminal device. The second terminal device may determine, based on one or more of the communication type, the identifier of the unicast connection or the identifier of the groupcast communication group, and the identifier of the first terminal device that are included in the SCI, the unicast connection or groupcast communication group corresponding to this time of transmission. After determining the unicast connection or groupcast communication group corresponding to this time of transmission, the second terminal device determines the HARQ process used for the unicast connection or groupcast communication group corresponding to this time of transmission.

In this embodiment, the second terminal device may separately maintain one group of HARQ processes (or one HARQ entity) for a plurality of unicast connections or groupcast communication groups on one SL carrier; or may maintain one group of shared unicast HARQ processes (or one shared unicast HARQ entity) on one SL carrier; and/or may maintain one group of shared groupcast HARQ processes (or one shared groupcast HARQ entity) on one SL carrier. The shared unicast HARQ processes and the shared groupcast HARQ processes may be the same group of HARQ processes, or may be different groups of HARQ processes. The shared unicast HARQ entity and the shared groupcast HARQ entity may also be the same HARQ entity, or may be different HARQ entities.

When both the first terminal device and the second terminal device separately maintain one group of HARQ processes (or one HARQ entity) for a plurality of unicast connections, or groupcast communication groups, or each group member of the groupcast communication group on one SL carrier. Alternatively, the first terminal device maintains one group of shared unicast HARQ processes (or one shared unicast HARQ entity) or one group of shared groupcast HARQ processes (or one shared groupcast HARQ entity) on one SL carrier. When the second terminal device maintains one group of HARQ processes (or one HARQ entity) for a plurality of unicast connections or groupcast communication groups on one SL carrier, the SCI includes the identifier of the HARQ process used for the unicast connection or the groupcast communication group. Based on one or more of the following information included in the SCI: the identifier of the HARQ process, the identifier of the unicast connection or the identifier of the groupcast communication group, and the identifier of the first terminal device, the second terminal device determines, from the group of HARQ processes (or the group of HARQ processes included in the HARQ entity) corresponding to the unicast connection or groupcast communication group corresponding to this time of transmission on the SL carrier carrying the data packet, the HARQ process corresponding to the identifier that is of the HARQ process and that is included in the SCI, as the HARQ process used for the unicast connection or groupcast communication group corresponding to this time of transmission.

The first terminal device separately maintains one group of HARQ processes (or one HARQ entity) for a plurality of unicast connections, or groupcast communication groups, or each group member of the groupcast communication group on one SL carrier, and the second terminal device maintains one group of shared unicast HARQ processes (or one shared unicast HARQ entity) or one group of shared groupcast HARQ processes (or one shared groupcast HARQ entity) on one SL carrier. Alternatively, both the first terminal device and the second terminal device maintain one group of shared unicast HARQ processes (or one shared unicast HARQ entity) or one group of shared groupcast HARQ processes (or one shared groupcast HARQ entity) on one SL carrier. For example, the HARQ process used for the unicast connection or groupcast communication group corresponding to this time of transmission may be determined by using the following two methods:

Method 1: The SCI does not carry the identifier of the HARQ process, but carries the information about the N SL transmission units. The second terminal device determines, based on the identification information of the carrier on which the N SL transmission units are located, the SL carrier carrying the data packet; and selects an idle HARQ process from the SL carrier carrying the data packet, as the HARQ process used for the unicast connection or groupcast communication group corresponding to this time of transmission. Data received by the second terminal device on the first SL transmission unit is considered as newly transmitted data, and data received on a subsequent SL transmission unit is considered as retransmitted data. When the second terminal device completes processing all the N SL transmission units, the HARQ process is considered to be idle. Optionally, when the second terminal device has not received data on any SL transmission unit in a second to an $N^{th}$ SL transmission units, the HARQ process is considered to be idle. Optionally, after the second terminal device successfully decodes the transmitted data or feeds back ACK to the first terminal device, the HARQ process is considered to be idle.

Method 2: The SCI carries information such as the identification information of the first terminal device, the identifier of the HARQ process, and the identifier of the unicast connection or the identifier of the groupcast communication group. After receiving SCI of an initially transmitted data packet of the first terminal device, the second terminal device selects an idle HARQ process; associates the idle HARQ process with the identification information of the first terminal device, the identifier of the HARQ process, and the identifier of the unicast connection or the identifier of the groupcast communication group that are included in the SCI of the initially transmitted data packet; and uses the idle HARQ process as the HARQ process for processing this time of SL transmission. When the second terminal device receives SCI of a retransmitted data packet of the first terminal device, if there is a HARQ process that is associated with the identification information of the first terminal device, the identification information of the HARQ process, and the identifier of the unicast connection or the identifier of the groupcast communication group in the SCI of the retransmitted data packet, the second terminal device delivers the retransmitted data packet to the associated HARQ process for processing. If there is no HARQ process that is associated with the identification information of the first terminal device, the identification information of the HARQ process, and the identifier of the unicast connection or the identifier of the groupcast communication group, the second terminal device may select an idle HARQ process; and associate the idle HARQ process with the identification information of the first terminal device, the identifier of the HARQ process, and the identifier of the unicast connection or the identifier of the groupcast communication group in the SCI of the retransmitted data packet, to obtain the HARQ process used for the unicast connection or the groupcast communication group for carrying the data packet. Optionally, the HARQ process may alternatively be associated with the identification information of the first terminal device and the identifier of the HARQ process that are included in the SCI, and the HARQ process does not need to be associated with the identifier of the unicast connection or the identifier of the groupcast communication group.

Optionally, the second terminal device may alternatively ignore the SCI of the retransmitted data packet. After the second terminal device successfully decodes the initially transmitted data packet or the retransmitted data packet or the second terminal device feeds back ACK to the first terminal device, the HARQ process for processing the initially transmitted data packet or the retransmitted data packet is considered to be idle. Optionally, when an idle HARQ process is associated with the identification information of the first terminal device, the identifier of the HARQ process, and the identifier of the unicast connection or the identifier of the groupcast communication group in the SCI of the initially transmitted data packet, a timer may be started for the HARQ process. When the HARQ process is used for processing the retransmitted data packet, the timer is restarted. When the timer expires, the HARQ process is considered to be idle. Timing duration of the timer may be configured by the resource scheduling device for the second terminal device by using system information or an RRC message, or configured by the first terminal device for the second terminal device by using an RRC message, or preconfigured in a storage device of the second terminal device.

After determining the HARQ process used for the unicast connection or groupcast communication group corresponding to this time of transmission, the second terminal device delivers the data packet to the HARQ process for processing. If the data packet is an initially transmitted data packet, the data packet is decoded. If the data packet is a retransmitted data packet, retransmitted data may be directly decoded, or retransmitted data and data stored in a cache associated with the HARQ process may be combined and decoded.

Step S104: The second terminal device sends a HARQ feedback result of the data packet to the first terminal device.

The HARQ feedback result is acknowledgement (acknowledge, ACK) or negative acknowledgement (Non-acknowledge, NACK). Herein, the ACK indicates that decoding succeeds, and the NACK indicates that decoding fails.

Step S105: When the first terminal device has not received the HARQ feedback result or the received HARQ feedback result indicates that the data packet fails to be transmitted, the first terminal device transmits the data packet by using a next unused SL transmission unit in the N SL transmission units.

For example, after sending the data packet, the first terminal device monitors the HARQ feedback result on the resource used for the HARQ feedback result. If no ACK or NACK is received or a NACK is received, the data packet is retransmitted by using the next unused SL transmission unit. If the first terminal device receives the ACK on the resource used for the HARQ feedback result, it indicates that the data packet is successfully transmitted. Optionally, the first terminal device may trigger sending of uplink control information (uplink control information, UCI), and notify the resource scheduling device of an ACK result by using the UCI. The UCI may further carry any one or more of the following information: information about a carrier carrying the data packet, information about a BWP carrying the data packet, information about a resource pool carrying the data packet, the identification information of the unicast connection or the identification information of the groupcast communication group, and the identifier of the HARQ process used for the unicast connection or groupcast communication group corresponding to this time of transmission.

When the first terminal device receives the ACK, optionally, the first terminal device may trigger an ACK feedback process. When there is an uplink (uplink, UL) resource, the first terminal device generates and sends a MAC control element (control element, CE), and notifies the resource scheduling device of an ACK result fed back by using the MAC CE. The MAC CE may further carry any one or more of the following information: information about a carrier carrying the data packet, information about a BWP carrying the data packet, information about a resource pool carrying the data packet, the identification information of the unicast connection or the identification information of the groupcast communication group, and the identifier of the HARQ process used for the unicast connection or groupcast communication group corresponding to this time of transmission. Once the ACK feedback process is triggered, the ACK feedback process is in a pending (pending) state. When the MAC CE is sent or the N SL transmission units allocated by the resource scheduling device all expire, the ACK feedback process is cancelled.

The resource scheduling device learns, based on the ACK result sent by the first terminal device, that the data packet is successfully transmitted. If there is an unused transmission unit in the N transmission units, the resource scheduling device may allocate the unused transmission unit to another terminal device for use, to avoid a waste of resources.

In this embodiment, the resource scheduling device indicates the information about the N SL transmission units to the first terminal device by using the DCI. The N SL transmission units are used on the SL for sending the data packet of the unicast connection or the groupcast communication group. The first terminal device transmits the data packet to the second terminal device by using the unused SL transmission unit in the N SL transmission units through the HARQ process used for the unicast connection or the groupcast communication group. The second terminal device sends the HARQ feedback result to the first terminal device based on the decoding result. When the first terminal device has not received the HARQ feedback result or the received HARQ feedback result indicates that the data packet fails to be transmitted, the first terminal device retransmits the data packet by using the next unused SL transmission unit in the N SL transmission units. A HARQ feedback retransmission mechanism is introduced into SL transmission, thereby improving reliability of a data packet in the SL transmission. In addition, the resource scheduling device allocates a plurality of SL transmission units at a time, thereby avoiding a relatively long delay and a waste of request resources that are caused when the terminal device requests a resource from the resource scheduling device in each time of retransmission.

Embodiment 2

Differences between Embodiment 2 and Embodiment 1 include: In Embodiment 1, the first terminal device obtains the information about the N SL transmission units in the following manner: The first terminal device receives the DCI sent by the resource scheduling device, where the DCI includes the information about the N SL transmission units. In Embodiment 2, the first terminal device obtains the information about the N SL transmission units in the following manner: The first terminal device determines the information about the N SL transmission units in a resource pool preconfigured by the resource scheduling device (that is, a Mode-4 manner). When the first terminal device has to-be-transmitted data, the first terminal device may first determine a communication type or a specific unicast connection/groupcast communication group, and determine the information about the N SL transmission units from the available resource pool based on the determined communication type or the specific unicast connection/groupcast communication group. Optionally, when the first terminal device has to-be-transmitted data, the first terminal device may alternatively first determine the information about the N SL transmission units from the available resource pool, and then determine a specific communication type of data that the transmission unit is used to transmit or determine a specific unicast connection/groupcast communication group for which the transmission unit is used to transmit data. The remaining procedure in Embodiment 2 is the same as that in Embodiment 1. Refer to the descriptions in Embodiment 1. Details are not described herein again.

For example, for a terminal device in a connected mode, the resource scheduling device may send information about the resource pool by using a radio resource control (radio resource control, RRC) message. For a terminal device in an idle state, the resource scheduling device may broadcast information about the resource pool by using a system message, or information about the resource pool may be preconfigured for the terminal device, for example, preconfigured in a storage device of the terminal. Subsequently, when the first terminal device has data to be transmitted, a required SL transmission unit is selected from the resource pool. Due to different resource allocation manners, a manner for indicating a HARQ process and communication type is different from that in Embodiment 1. In this embodiment, the resource scheduling device does not need to use DCI to indicate the communication type and the identifier of the HARQ process used in this time of transmission, but only needs to use SCI to indicate information such as the communication type and/or the identifier of the HARQ process in this time of transmission.

Figure 4:
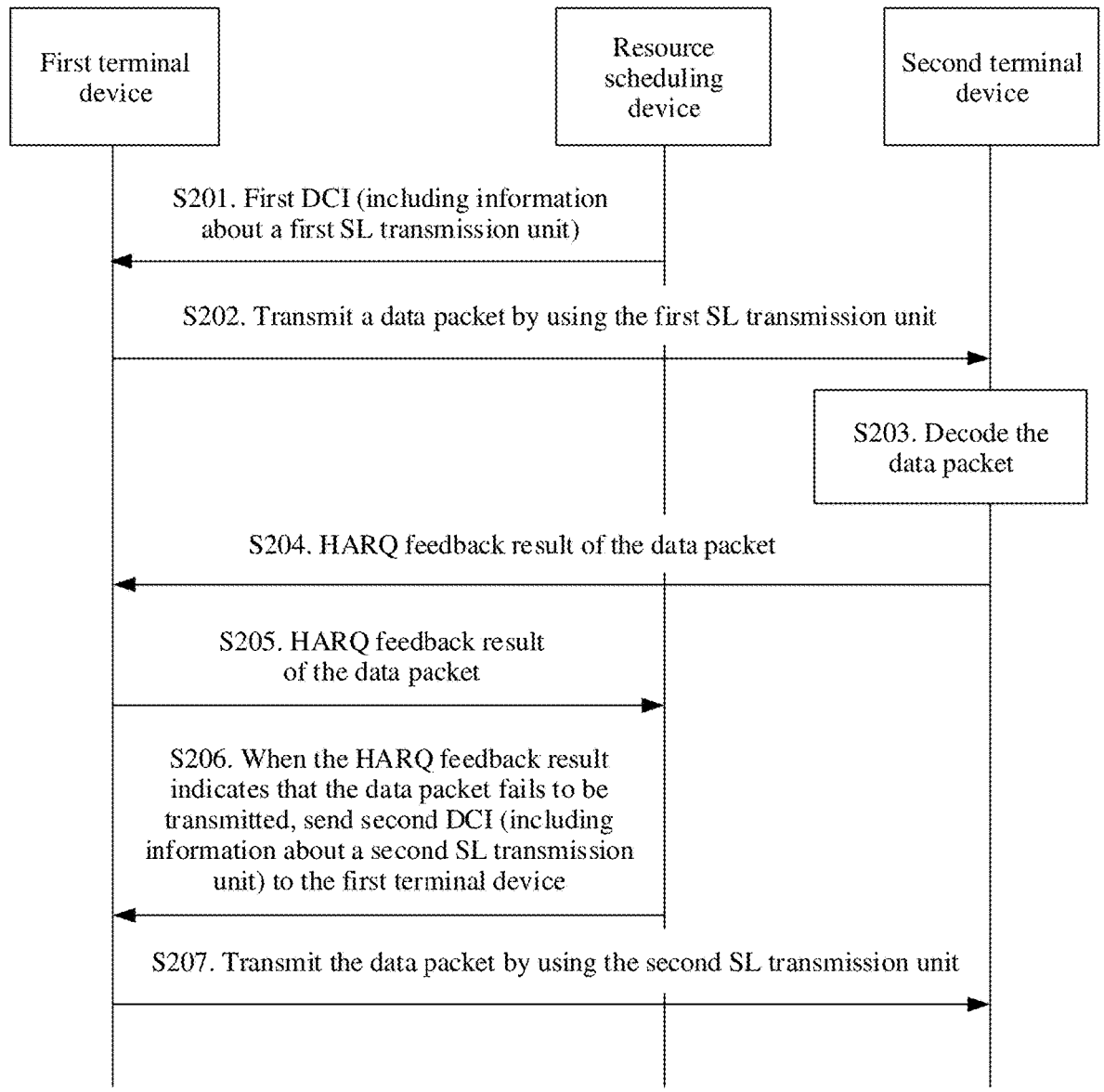
FIG. 4 is a signaling flowchart of a transmission method according to Embodiment 3 of this application.

FIG. 4 is a signaling flowchart of a transmission method according to Embodiment 3 of this application. A resource allocation manner in this embodiment is the same as that in Embodiment 1, and the two resource allocation manners are both a Mode-3 manner. However, in this embodiment, a resource scheduling device allocates only one SL transmission unit to a first terminal device each time. When retransmission is required, the first terminal device further needs to request the resource scheduling device to reallocate a transmission resource. As shown in FIG. 4, the method provided in this embodiment includes the following steps:

Step S201: The resource scheduling device sends first DCI to the first terminal device. The first DCI includes information about a first SL transmission unit.

For example, the first SL transmission unit is used on an SL for sending a to-be-transmitted data packet of a unicast connection or a groupcast communication group. The SL is a wireless communication link between the first terminal device and a second terminal device. The information about the first SL transmission unit includes identification information of a carrier to which the first SL transmission unit belongs and information about a time-frequency resource of the first SL transmission unit.

For example, the first DCI further includes any one or more of the following information: information about a communication type, an identifier of the HARQ process, an identifier of a BWP, identification information of a carrier, identification information of a resource pool, identification information of a unicast connection or a groupcast communication group, initial transmission indication information or retransmission indication information, a redundancy version (redundancy version, RV) of the data packet, information about a resource that is used for a HARQ feedback result on an SL link from the second terminal device to the first terminal device, and the like. The communication type is a unicast communication type or a groupcast communication type. The identification information of the unicast connection may be an identifier of the second terminal device. The information about the resource used for the HARQ feedback result may include information about a resource that is used for a HARQ feedback from the second terminal device and the first terminal device, and/or information about a resource that is used when the first terminal device forwards the HARQ feedback result to the resource scheduling device.

When the first DCI does not include the communication type, the communication type may alternatively be implicitly indicated in another manner. The resource scheduling device may configure different time-frequency resources for unicast communication/groupcast communication/broadcast communication of the first terminal device, for example, configure a mapping relationship between the communication type and a carrier/resource pool/BWP. The first terminal device may determine, based on a carrier/resource pool/BWP to which the first SL transmission unit belongs, a specific communication type for which the first SL transmission unit is used.

Step S202: The first terminal device transmits the data packet by using the first SL transmission unit through a HARQ process used for the unicast connection or the groupcast communication group.

For example, the first terminal device first determines the unicast connection or groupcast communication group corresponding to this time of transmission; and after determining the unicast connection or groupcast communication group corresponding to this time of transmission, further determines the HARQ process for processing this time of transmission, that is, the HARQ process used for the unicast connection or groupcast communication group corresponding to this time of transmission. Optionally, the first terminal device may alternatively first determine the HARQ process for processing this time of transmission, and then determine the unicast connection or groupcast communication group corresponding to this time of transmission. For a manner of determining, refer to the descriptions of step 102 in Embodiment 1. Details are not described herein again. The HARQ process used for the unicast connection or groupcast communication group corresponding to this time of transmission is associated with an identifier of the unicast connection or an identifier of the groupcast communication group. The identifier of the HARQ process corresponding to the HARQ process may be carried in SCI sent by the first terminal device to the second terminal device.

When the DCI indicates initial transmission, the first terminal device generates an SL MAC layer data packet through MAC layer packet assembly, and transmits the data packet by using the first SL transmission unit. When the DCI indicates retransmission, the first terminal device transmits data in a cache associated with the determined HARQ process.

Optionally, the SCI of the data packet carries indication information. The indication information is used to indicate the second terminal device to perform the HARQ feedback. The indication information may be the communication type, the identifier of the unicast connection, the identifier of the groupcast communication group, or a value of a HARQ feedback field of at least one bit. The value of the HARQ feedback field is used to indicate whether to perform the HARQ feedback. The SCI may alternatively be scrambled by using a unicast RNTI and a groupcast RNTI, to indicate the second terminal device to perform HARQ the feedback. The identifier of the unicast connection may be the identifier of the second terminal device. The unicast RNTI may be the identifier of the unicast connection. The groupcast RNTI may be the identifier of the groupcast communication group.

Optionally, the SCI of the data packet may further include any one or more of the following information: information about a resource used for the HARQ feedback result, initial transmission indication information or retransmission indication information, an RV of the data packet, information about a carrier carrying the data packet, information about a BWP carrying the data packet, information about a resource pool carrying the data packet, an identifier of the HARQ process used for the unicast connection or the groupcast communication group, the identifier of the unicast connection or the identifier of the groupcast communication group, information about the communication type, and the identifier of the first terminal device. The information about the resource used for the HARQ feedback result may be implicitly determined based on a location of a time-frequency resource in which the SCI is located.

Step S203: The second terminal device decodes the data packet by using the HARQ process used for the unicast connection or groupcast communication group corresponding to this time of transmission.

For example, after receiving the data packet, the second terminal device first determines the unicast connection or groupcast communication group corresponding to this time of transmission, and further determines the HARQ process used for the unicast connection or the groupcast communication group. The second terminal device may separately maintain one group of HARQ processes (or one HARQ entity) for a plurality of unicast connections or groupcast communication groups on one SL carrier, or may maintain one group of shared unicast HARQ processes (or one shared unicast HARQ entity) or one group of shared groupcast HARQ processes (or one shared groupcast HARQ entity) on one SL carrier. The shared unicast HARQ processes and the shared groupcast HARQ processes may be the same group of HARQ processes, or may be different groups of HARQ processes. The shared unicast HARQ entity and the shared groupcast HARQ entity may be the same HARQ entity, or may be different HARQ entities.

The second terminal device separately maintains one HARQ entity/one group of HARQ processes for a plurality of unicast connections or groupcast communication groups on one SL carrier, or the second terminal device maintains one group of shared unicast HARQ processes or groupcast HARQ processes on one SL carrier. For a method for determining the HARQ process used for the unicast connection or groupcast communication group corresponding to this time of transmission, refer to the descriptions in Embodiment 1. Details are not described herein again.

For example, after determining the HARQ process used for the unicast connection or groupcast communication group corresponding to this time of transmission, the second terminal device delivers the data packet to the HARQ process for processing. If the data packet is an initially transmitted data packet, the data packet is decoded. If the data packet is a retransmitted data packet, the retransmitted data packet may be directly decoded, or the retransmitted data packet and data stored in a cache associated with the HARQ process may be combined and decoded.

Step S204: The second terminal device sends a HARQ feedback result of the data packet to the first terminal device.

For example, if decoding succeeds, the second terminal device sends ACK to the first terminal device. If decoding fails, the second terminal device sends NACK to the first terminal device.

Step S205: The first terminal device sends the HARQ feedback result of the data packet to the resource scheduling device.

For example, after completing sending the data packet, the first terminal device monitors the HARQ feedback result on a resource used for the HARQ feedback result. In this embodiment, the first terminal device sends the HARQ feedback result to the resource scheduling device when ACK or NACK is received or a HARQ feedback is not received. For example, if the first terminal device receives the ACK sent by the second terminal device, the first terminal device forwards the ACK to the resource scheduling device. If the first terminal device receives the NACK sent by the second terminal device or has not received the HARQ feedback sent by the second terminal device, the first terminal device sends the NACK to the resource scheduling device.

The first terminal device may trigger sending of UCI, and notifies the resource scheduling device of the HARQ feedback result by using the UCI. The UCI may further carry any one or more of the following information: information about a carrier carrying the data packet, information about a BWP carrying the data packet, information about a resource pool carrying the data packet, the identifier of the unicast connection or the identification information of the groupcast communication group, and the identifier of the HARQ process used for the unicast connection or groupcast communication group corresponding to this time of transmission.

Alternatively, the first terminal device may trigger an ACK feedback process. When there is a UL resource, the first terminal device generates and sends a MAC CE, and notifies the resource scheduling device of the HARQ feedback result by using the MAC CE. The MAC CE may further carry any one or more of the following information: information about a carrier carrying the data packet, information about a BWP carrying the data packet, information about a resource pool carrying the data packet, the identifier of the unicast connection or the identification information of the groupcast communication group, and the identifier of the HARQ process used for the unicast connection or groupcast communication group corresponding to this time of transmission.

Step S206: When the HARQ feedback result indicates that the data packet fails to be transmitted, the resource scheduling device sends second DCI to the first terminal device. The second DCI includes information about a second SL transmission unit.

When the HARQ feedback result indicates that data transmission fails, the resource scheduling device detects whether a quantity of times of retransmission of the data packet reaches a maximum quantity of times. If the quantity of times of retransmission does not reach the maximum quantity of times, the resource scheduling device allocates the second SL transmission unit to the first terminal device. The information about the second SL transmission unit includes identification information of a carrier to which the second SL transmission unit belongs and information about a time-frequency resource of the second SL transmission unit. The second SL transmission unit is used for retransmission. If the quantity of times of retransmission reaches the maximum quantity of times, or the HARQ feedback result indicates that data transmission succeeds, the resource scheduling device does not allocate the second SL transmission unit.

It should be noted that step S206 is an optional step. When the HARQ feedback result indicates that the data packet fails to be transmitted, the resource scheduling device may also perform other processing.

Step S207: The first terminal device transmits the data packet by using the second SL transmission unit according to the HARQ process used for the unicast connection or the groupcast communication group.

For example, the initial transmission and the retransmission use the same HARQ process. The first terminal device retransmits the data packet by using the second SL transmission unit. After the retransmission, the first terminal device continues to monitor the HARQ feedback result.

In this embodiment, the resource scheduling device allocates the SL transmission unit to the first terminal device by using the first DCI; transmits the data packet by using the first SL transmission unit through the HARQ process used for the unicast connection or the groupcast communication group; monitors the HARQ feedback result; and sends the HARQ feedback result to the resource scheduling device. When the HARQ feedback result indicates that data transmission fails, the resource scheduling device allocates, to the first terminal device, the second SL transmission unit, and transmits the data packet by using the second SL transmission unit through the HARQ process used for the unicast connection or the groupcast communication group. Based on the HARQ feedback retransmission mechanism, high reliability of a data packet can be ensured. The resource scheduling device determines, based on the HARQ feedback result, whether to schedule a retransmission resource, to avoid a waste of resources that may be caused when a plurality of transmission units are scheduled at a time.

Embodiment 4

Differences between Embodiment 4 and Embodiment 3 include: (1) In Embodiment 3, the first terminal device obtains the information about the first SL transmission unit in the following manner: The first terminal device receives the first DCI sent by the resource scheduling device, where the first DCI includes the information about the first SL transmission unit. In Embodiment 4, the first terminal device obtains the information about the first SL transmission unit in the following manner: The first terminal device determines the information about the first SL transmission unit in a resource pool preconfigured by the resource scheduling device. When the first terminal device has to-be-transmitted data, the first terminal device may first determine a communication type or a specific unicast connection/groupcast communication group, and determine the information about the first SL transmission unit from the available resource pool based on the determined communication type or the specific unicast connection/groupcast communication group. Optionally, when the first terminal device has to-be-transmitted data, the first terminal device may first determine the information about the first SL transmission unit from the available resource pool, and then determine a specific communication type of data that the transmission unit is used to transmit, or determine a specific unicast connection/groupcast communication group for which the transmission unit is used to transmit data. (2) In Embodiment 3, the second terminal device sends the HARQ feedback result to the first terminal device, and then the first terminal device sends the HARQ feedback result to the resource scheduling device. In Embodiment 4, after decoding a data packet, the second terminal device sends the HARQ feedback result to the resource scheduling device based on a decoding result with no need of forwarding performed by the first terminal device. The remaining procedure in Embodiment 4 is the same as that in Embodiment 3. Details are not described herein again.

In addition, the first terminal device and the second terminal device may be within coverage of the same base station, or may be within coverage of different base stations. Therefore, in Embodiment 4, the HARQ feedback result needs to be sent between a serving base station of the first terminal device and a serving base station of the second terminal device by using an interface between the base stations.

Embodiment 5

Differences between Embodiment 5 and Embodiment 3 include: (1) In Embodiment 3, the resource scheduling device indicates the information about the first SL transmission unit to the first terminal device by using the first DCI. In Embodiment 5, the first terminal device determines the information about the first SL transmission unit in a resource pool preconfigured by the resource scheduling device. (2) After a data packet is transmitted, in Embodiment 3, the resource scheduling device determines, based on the HARQ feedback result, whether to schedule a retransmission resource. If the retransmission resource needs to be scheduled, the resource scheduling device indicates, to the first terminal device by using the second DCI, the information about the second SL transmission unit used for retransmission. In Embodiment 5, when receiving the HARQ feedback result sent by the second terminal device, the first terminal device does not send the HARQ feedback result to the resource scheduling device, but determines, based on the HARQ feedback result, whether to schedule a retransmission resource. If the retransmission resource needs to be scheduled, the first terminal device selects the second SL transmission unit from the preconfigured resource pool for retransmission. The remaining procedure in Embodiment 5 is the same as that in Embodiment 3. Details are not described herein again.

Figure 5:
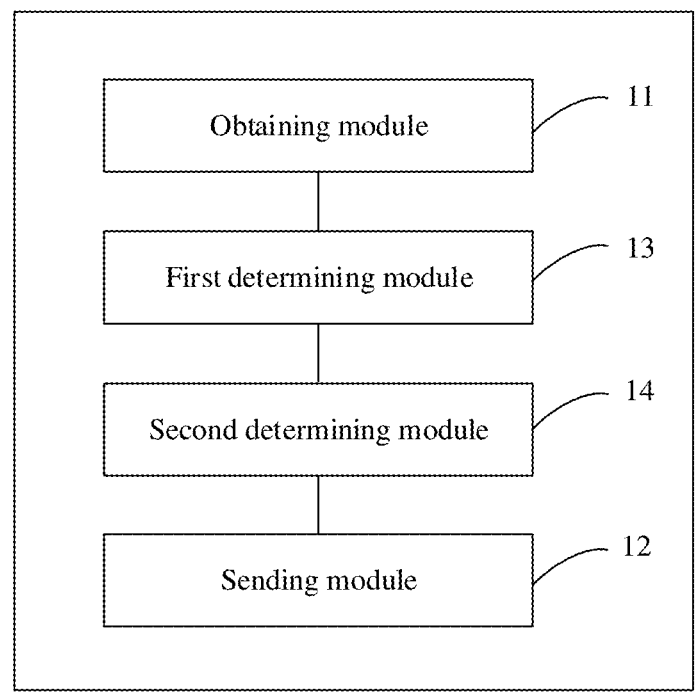
FIG. 5 is a schematic structural diagram of a transmission apparatus according to Embodiment 6 of this application.

FIG. 5 is a schematic structural diagram of a transmission apparatus according to Embodiment 6 of this application.

The apparatus may be applied to a first terminal device. As shown in FIG. 5, the apparatus may include an obtaining module 11 and a sending module 12.

The obtaining module 11 is configured to obtain information about N sidelink SL transmission units. The N SL transmission units are used on an SL for sending a to-be-transmitted data packet of a unicast connection or a groupcast communication group. The SL is a wireless communication link between the first terminal device and a second terminal device. Herein, N is an integer greater than or equal to 1.

The sending module 12 is configured to transmit the data packet by using an unused SL transmission unit in the N SL transmission units through a hybrid automatic repeat request HARQ process used for the unicast connection or the groupcast communication group.

The sending module 12 is further configured to: when the first terminal device has not received a HARQ feedback result or a received HARQ feedback result indicates that the data packet fails to be transmitted, transmit, by the first terminal device, the data packet by using a next unused SL transmission unit in the N SL transmission units.

In an example, the obtaining module 11 is specifically configured to:

receive downlink control information DCI sent by a resource scheduling device, where the DCI includes the information about the N SL transmission units, and the information about the N SL transmission units includes identification information of a carrier on which the N SL transmission units are located and information about a time-frequency resource occupied by the N SL transmission units.

In another example, the obtaining module 11 is specifically configured to:

determine the information about the N SL transmission units in a resource pool preconfigured by a resource scheduling device, where the information about the N SL transmission units includes identification information of a carrier on which the N SL transmission units are located and information about a time-frequency resource occupied by the N SL transmission units.

In an example, the DCI further includes any one or more of the following information: a communication type, an identifier of the HARQ process, and an identifier of a bandwidth part. The communication type is a unicast communication type or a groupcast communication type.

Optionally, the apparatus further includes a first determining module 13 and a second determining module 14. The first determining module 13 is configured to determine, based on the communication type, the unicast connection or the groupcast communication group in a unicast connection or groupcast communication group that has a to-be-transmitted data packet and that implements transmission on the carrier on which the N SL transmission units are located.

The second determining module 14 is configured to: based on the identifier that is of the HARQ process and that is included in the DCI, determine, in a group of HARQ processes corresponding to the unicast connection or the groupcast communication group on the SL carrier on which the N SL transmission units are located, the HARQ process used for the unicast connection or the groupcast communication group.

The apparatus provided in this application may be configured to perform the method performed by the first terminal device in Embodiment 1 and Embodiment 2. A specific implementation method and a technical effect are similar to those of the method. Details are not described herein again.

Figure 6:
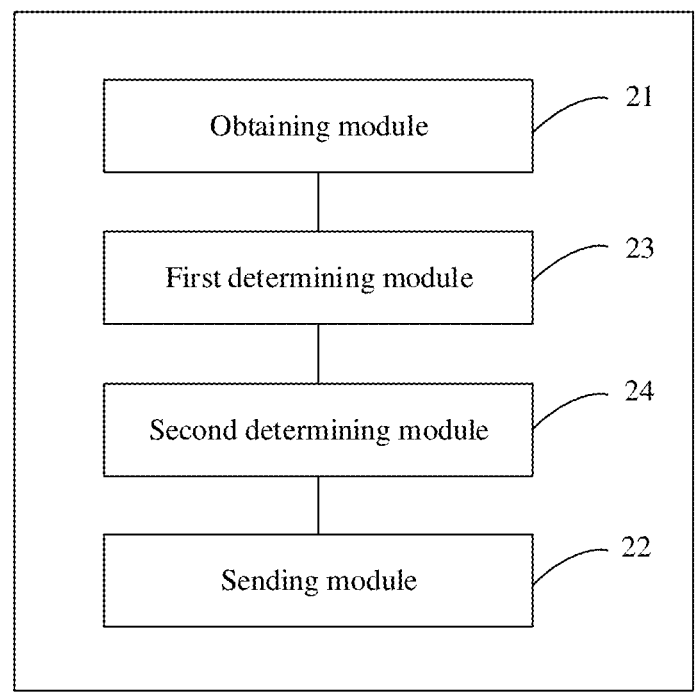
FIG. 6 is a schematic structural diagram of a transmission apparatus according to Embodiment 7 of this application.

FIG. 6 is a schematic structural diagram of a transmission apparatus according to Embodiment 7 of this application. The apparatus may be applied to a first terminal device. As shown in FIG. 6, the apparatus may include an obtaining module 21 and a sending module 22. The obtaining module 21 is configured to obtain information about a first sidelink SL transmission unit. The first SL transmission unit is used on an SL for sending a to-be-transmitted data packet of a unicast connection or a groupcast communication group. The SL is a wireless communication link between the first terminal device and a second terminal device.

The sending module 22 is configured to transmit the data packet by using the first SL transmission unit through a hybrid automatic repeat request HARQ process corresponding to the unicast connection or the groupcast communication group.

The obtaining module 21 is further configured to: when the data packet fails to be transmitted, obtain information about a second SL transmission unit.

The sending module 22 is further configured to retransmit the data packet by using the second SL transmission unit.

In an example, the obtaining module 21 is specifically configured to:

receive first downlink control information DCI sent by a resource scheduling device, where the first DCI includes the information about the first SL transmission unit, and the information about the first SL transmission unit includes identification information of a carrier on which the first SL transmission unit is located and information about a time-frequency resource occupied by the first SL transmission unit; and receive second DCI sent by the resource scheduling device, where the second DCI includes the information about the second SL transmission unit, the information about the second SL transmission unit includes identification information of a carrier on which the second SL transmission unit is located and information about a time-frequency resource occupied by the second SL transmission unit, and the second SL transmission unit is allocated by the resource scheduling device based on a HARQ feedback result reported by the first terminal device or the second terminal device.

In another example, the obtaining module 21 is specifically configured to:

determine the information about the first SL transmission unit or the information about the second SL transmission unit in a resource pool preconfigured by a resource scheduling device, where the information about the first SL transmission unit includes identification information of a carrier on which the first SL transmission unit is located and information about a time-frequency resource occupied by the first SL transmission unit, and the information about the second SL transmission unit includes identification information of a carrier on which the second SL transmission unit is located and information about a time-frequency resource occupied by the second SL transmission unit.

In an example, the first DCI further includes at least one of the following information: information about a communication type, an identifier of the HARQ process, and an identifier of a bandwidth part. The communication type is a unicast communication type or a groupcast communication type.

Optionally, the apparatus further includes a first determining module 23 and a second determining module 24. The first determining module 23 is configured to determine, based on the communication type, the unicast connection or the groupcast communication group in a unicast connection or groupcast communication group that has a to-be-transmitted data packet and that implements transmission on the carrier on which the first SL transmission unit is located.

The second determining module 24 is configured to: based on the identifier that is of the HARQ process and that is included in the first DCI, determine, in a group of HARQ processes corresponding to the unicast connection or the groupcast communication group on the SL carrier on which the first SL transmission unit is located, the HARQ process used for the unicast connection or the groupcast communication group.

The apparatus provided in this application may be configured to perform the method performed by the first terminal device in Embodiment 2 to Embodiment 5. A specific implementation method and a technical effect are similar to those of the method. Details are not described herein again.

Figure 7:
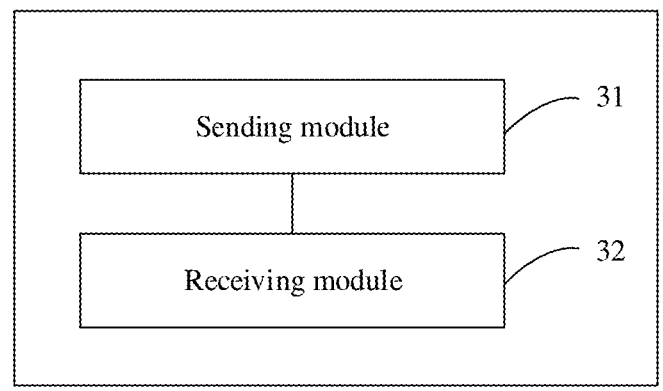
FIG. 7 is a schematic structural diagram of a transmission apparatus according to Embodiment 8 of this application.

FIG. 7 is a schematic structural diagram of a transmission apparatus according to Embodiment 8 of this application. The apparatus may be applied to a resource scheduling device. As shown in FIG. 7, the apparatus may include a sending module 31 and a receiving module 32. The sending module 31 is configured to send information about N sidelink SL transmission units to a first terminal device. The N SL transmission units are used on an SL for sending a to-be-transmitted data packet of a unicast connection or a groupcast communication group. The SL is a wireless communication link between the first terminal device and a second terminal device. Herein, N is an integer greater than or equal to 1.

The receiving module 32 is configured to receive a HARQ feedback result sent by the first terminal device or the second terminal device.

In an example, the sending module 31 is specifically configured to:

send downlink control information DCI to the first terminal device, where the DCI includes the information about the N SL transmission units, and the information about the N SL transmission units includes identification information of a carrier on which the N SL transmission units are located and information about a time-frequency resource occupied by the N SL transmission units.

The apparatus provided in this application may be configured to perform the method performed by the resource scheduling device in Embodiment 1 to Embodiment 5. A specific implementation method and a technical effect are similar to those of the method. Details are not described herein again.

Optionally, in Embodiment 6 to Embodiment 8, a plurality of groups of HARQ processes are set on an SL carrier on which an SL transmission unit is located, and each group of HARQ processes in the plurality of groups of HARQ processes can be used for data transmission of only one unicast connection or groupcast communication group. Alternatively, a group of shared unicast HARQ processes or groupcast HARQ processes are set on an SL carrier on which an SL transmission unit is located, the shared unicast HARQ processes can be used for data transmission of all unicast connections on the SL carrier on which the SL transmission unit is located, and the shared groupcast HARQ processes can be used for data transmission of all groupcast communication groups on the SL carrier on which the SL transmission unit is located.

Optionally, in Embodiment 6 to Embodiment 8, the SCI of the data packet carries indication information, and the indication information is used to indicate the second terminal device to perform a HARQ feedback. The indication information is a communication type. The communication type is a unicast communication type or a groupcast communication type.

Alternatively, the indication information is an identifier of the second terminal device or an identifier of the groupcast communication group.

Alternatively, the indication information is a value of a HARQ feedback field of at least one bit, and the value of the HARQ feedback field is used to indicate whether to perform the HARQ feedback.

Optionally, in Embodiment 6 to Embodiment 8, the SCI of the data packet further includes any one or more of the following information: information about a resource used for the HARQ feedback result, initial transmission indication information or retransmission indication information, a redundancy version of the data packet, information about the carrier carrying the data packet, information about a bandwidth part BWP carrying the data packet, an identifier of the HARQ process used for the unicast connection or the groupcast communication group, the information about N SL transmission units, the identifier of the unicast connection or the identifier of the groupcast communication group, information about the communication type, and the identifier of the first terminal device.

Figure 8:
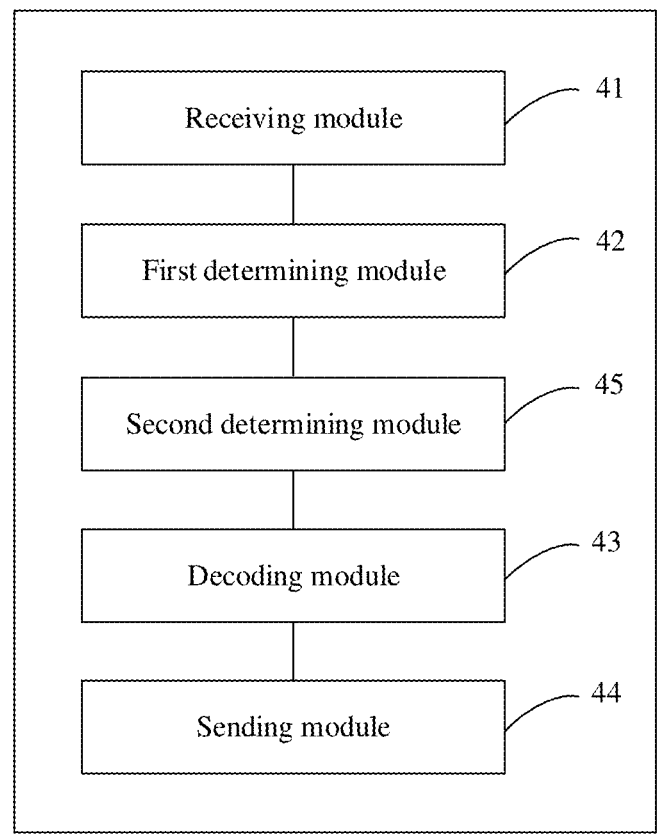
FIG. 8 is a schematic structural diagram of a transmission apparatus according to Embodiment 9 of this application.

FIG. 8 is a schematic structural diagram of a transmission apparatus according to Embodiment 9 of this application. The apparatus may be applied to a second terminal device. As shown in FIG. 8, the apparatus may include a receiving module 41, a first determining module 42, a decoding module 43, and a sending module 44. The receiving module 41 is configured to receive a data packet and sidelink control information SCI. The SCI includes one or more of the following information: a communication type, and an identifier of a unicast connection or an identifier of a groupcast communication group.

The first determining module 42 is configured to determine, based on the communication type and/or an identifier of the unicast connection or an identifier of the groupcast communication group, a unicast connection or groupcast communication group corresponding to this time of transmission. The communication type is a unicast communication type or a groupcast communication type.

The decoding module 43 is configured to decode the data packet through a hybrid automatic repeat request HARQ process used for the unicast connection or groupcast communication group corresponding to this time of transmission.

The sending module 44 is configured to send a HARQ feedback result to a first terminal device or a resource scheduling device based on a decoding result. Data is transmitted between the first terminal device and the second terminal device via a sidelink.

In an example, the SCI further includes an identifier of the HARQ process, an identifier of the first terminal device, and identification information of an SL carrier carrying the data packet. Optionally, the apparatus further includes a second determining module 45.

The second determining module 45 is configured to: based on the identifier of the HARQ process, the identifier of the first terminal device, the identifier of the unicast connection, or the identifier of the groupcast communication group included in the SCI, determine, in a group of HARQ processes corresponding to the unicast connection or groupcast communication group corresponding to this time of transmission on the SL carrier carrying the data packet, the HARQ process used for the unicast connection or groupcast communication group corresponding to this time of transmission.

Optionally, a plurality of groups of HARQ processes are set on the SL carrier carrying the data packet, and each group of HARQ processes in the plurality of groups of HARQ processes can be used for data transmission of only one unicast connection or groupcast communication group. Alternatively, a group of shared unicast HARQ processes or groupcast HARQ processes are set on the SL carrier carrying the data packet, the shared unicast HARQ processes can be used for data transmission of all unicast connections on the SL carrier carrying the data packet, and the shared groupcast HARQ processes can be used for data transmission of all groupcast communication groups on the SL carrier carrying the data packet.

The apparatus provided in this application may be configured to perform the method performed by the second terminal device in Embodiment 1 to Embodiment 5. A specific implementation method and a technical effect are similar to those of the method. Details are not described herein again.

Figure 9:
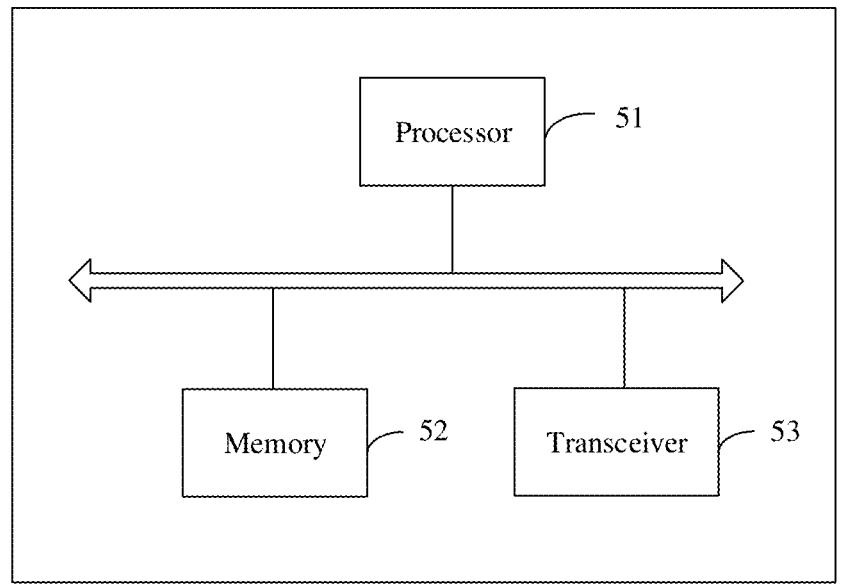
FIG. 9 is a schematic structural diagram of a terminal device according to Embodiment 10 of this application.

FIG. 9 is a schematic structural diagram of a terminal device according to Embodiment 10 of this application. As shown in FIG. 9, the terminal device provided in this embodiment includes a processor 51, a memory 52, and a transceiver 53. The memory 52 is configured to store instructions. The transceiver 53 is configured to communicate with another device. The processor 51 is configured to execute the instructions stored in the memory 52, so that the terminal device performs the steps of the methods performed by the first terminal device and the second terminal device in Embodiment 1 to Embodiment 5 of this application. Specific implementations and technical effects are similar to those in the foregoing embodiments. Details are not described herein again.

Figure 10:
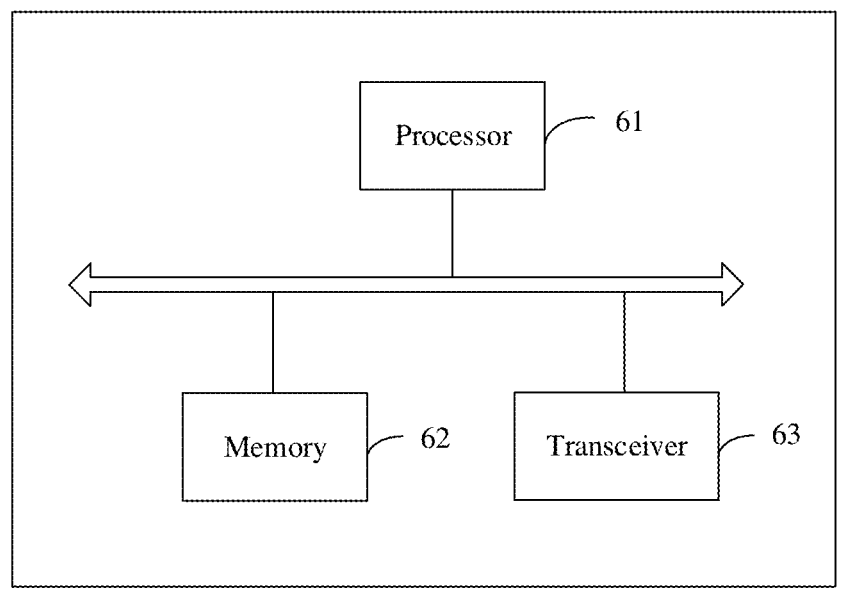
FIG. 10 is a schematic structural diagram of a resource scheduling device according to Embodiment 11 of this application.

FIG. 10 is a schematic structural diagram of a resource scheduling device according to Embodiment 11 of this application. As shown in FIG. 10, the resource scheduling device provided in this embodiment includes a processor 61, a memory 62, and a transceiver 63. The memory 62 is configured to store instructions. The transceiver 63 is configured to communicate with another device. The processor 61 is configured to execute the instructions stored in the memory 62, so that the resource scheduling device performs the steps of the methods performed by the resource scheduling device in Embodiment 1 to Embodiment 5 of this application. A specific implementation and a technical effect are similar to those in the foregoing embodiments. Details are not described herein again.

Embodiment 12 of this application provides a computer-readable storage medium. The computer-readable storage medium stores instructions. When the instructions are performed, a computer is enabled to perform the steps of the methods performed by the first terminal device and the second terminal device in Embodiment 1 to Embodiment 5 of this application. Specific implementations and technical effects are similar to those in the foregoing embodiments. Details are not described herein again.

Embodiment 13 of this application provides a computer-readable storage medium. The computer-readable storage medium stores instructions. When the instructions are executed, a computer is enabled to perform the steps of the methods performed by the resource scheduling device in Embodiment 1 to Embodiment 5 of this application. A specific implementation and a technical effect are similar to those in the foregoing embodiments. Details are not described herein again.

Embodiment 14 of this application provides a system-on-a-chip or a system chip. The system-on-a-chip or the system chip may be applied to a terminal device. The system-on-a-chip or the system chip includes: at least one communications interface, at least one processor, and at least one memory. The communications interface, the memory, and the processor are interconnected by using a bus. The processor executes instructions stored in the memory, so that the terminal device can perform the steps of the methods performed by the first terminal device and the second terminal device in Embodiment 1 to Embodiment 5 of this application. Specific implementations and technical effects are similar to those in the foregoing embodiments. Details are not described herein again.

Embodiment 15 of this application provides a system-on-a-chip or a system chip. The system-on-a-chip or the system chip may be applied to a resource scheduling device. The system-on-a-chip or the system chip includes: at least one communications interface, at least one processor, and at least one memory. The communications interface, the memory, and the processor are interconnected by using a bus. The processor executes instructions stored in the memory, so that the resource scheduling device can perform the steps of the methods performed by the resource scheduling device in Embodiment 1 to Embodiment 5 of this application. A specific implementation and a technical effect are similar to those in the foregoing embodiments. Details are not described herein again. For example, the resource scheduling device may be a base station, an access node in a radio access network, or another network device on another network side that provides a service for a terminal device.

It may be understood that the processor used in the resource scheduling device or terminal device in the embodiments of this application may be a central processing unit (CPU), a general purpose processor, a digital signal processor (DSP), an application-specific integrated circuit (ASIC), a field programmable gate array (FPGA) or another programmable logical device, a transistor logic device, a hardware component, or any combination thereof. The processor may implement or execute various example logical blocks, modules, and circuits described with reference to content disclosed in this application. The processor may alternatively be a combination implementing a computing function, for example, a combination of one or more microprocessors, or a combination of the DSP and a microprocessor.

The bus in the embodiments of this application may be an industry standard architecture (Industry Standard Architecture, ISA) bus, a peripheral component interconnect (Peripheral Component, PCI) bus, an extended industry standard architecture (Extended Industry Standard Architecture, EISA) bus, or the like. The bus may be classified into an address bus, a data bus, a control bus, and the like. For ease of representation, the bus in the accompanying drawings of this application is not limited to only one bus or only one type of bus.

In the several embodiments provided in this application, it should be understood that the disclosed apparatus and method may be implemented in other manners. For example, the apparatus embodiments described above are merely examples. For example, the division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer readable storage medium. The software functional unit is stored in a storage medium and includes several instructions for instructing a computer device (which may be a personal computer, a server, or a network device) or a processor (processor) to perform some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

What is claimed is:

1. A transmission method, comprising:
  obtaining information about a first sidelink (SL) transmission unit, wherein the first SL transmission unit is used on an SL for sending a to-be-transmitted data packet of a unicast connection or a groupcast communication group to a second terminal device, and the SL is a wireless communication link between a first terminal device and the second terminal device;
  transmitting the data packet by using the first SL transmission unit in accordance with a hybrid automatic repeat request (HARQ) process corresponding to the unicast connection or the groupcast communication group;
  receiving a HARQ feedback for the data packet in accordance with the HARQ process from the second terminal device on a first resource, wherein the first resource is determined according to a time domain location of sidelink control information (SCI) sent to the second terminal device;
  in response to the HARQ feedback for the data packet being negative information (NACK), obtaining information about a second SL transmission unit; and
  retransmitting the data packet by using the second SL transmission unit.

2. The method according to claim 1, wherein the method further comprises:
  in response to the HARQ feedback for the data packet from the second terminal device and the HARQ feedback being acknowledgment information (ACK), forwarding the ACK to a resource scheduling device; or
  in response to the HARQ feedback being the NACK or the first terminal device receiving no HARQ feedback for the data packet from the second terminal device, sending the NACK to the resource scheduling device.

3. The method according to claim 2, wherein the method further comprises:
  notifying the resource scheduling device of the HARQ feedback by said forwarding the ACK or said sending the NACK via uplink control information (UCI).

4. The method according to claim 1, wherein the first resource is determined according to an identifier of the second terminal device in groupcast communication and the time domain location of the SCI.

5. A transmission method, comprising:
  receiving a data packet and sidelink control information (SCI) from a first terminal device over a sidelink (SL) which is a wireless communication link between the first terminal device and a second terminal device, wherein the data packet is an initially transmitted data packet, wherein the SCI comprises an identifier of a hybrid automatic repeat request (HARQ) process, an identifier of the first terminal device and an identifier of the second terminal device;
  selecting an idle HARQ process to associate the identifier of the first terminal device, the identifier of the HARQ process, and the identifier of the second terminal device; and
  using the selected idle HARQ process as a HARQ process for processing current transmission.

6. The method according to claim 5, wherein the method further comprises:
  sending a HARQ feedback for the data packet in accordance with the selected idle HARQ process, to the first terminal device or a resource scheduling device.

7. An apparatus, applied to a first terminal device, comprising:
  at least one processor, and a memory storing instructions for execution by the at least one processor;
  wherein, when executed, the instructions cause the apparatus to perform operations comprising:
  obtaining information about a first sidelink (SL) transmission unit, wherein the first SL transmission unit is used on an SL for sending a to-be-transmitted data packet of a unicast connection or a groupcast communication group to a second terminal device, and the SL is a wireless communication link between the apparatus and the second terminal device;
  transmitting the data packet by using the first SL transmission unit in accordance with a hybrid automatic repeat request (HARQ) process corresponding to the unicast connection or the groupcast communication group;
  receiving a HARQ feedback for the data packet in accordance with the HARQ process from the second terminal device on a first resource, wherein the first resource is determined according to a time domain location of sidelink control information (SCI) sent to the second terminal device;
  in response to the HARQ feedback for the data packet being negative information (NACK), obtaining information about a second SL transmission unit; and
  retransmitting the data packet by using the second SL transmission unit.

8. The apparatus according to claim 7, wherein, when executed, the instructions cause the apparatus to perform operations comprising:
  in response to the apparatus receiving the HARQ feedback for the data packet from the second terminal device and the HARQ feedback being acknowledgment information (ACK), forwarding the ACK to a resource scheduling device; or in response to the HARQ feedback being the NACK or the apparatus receiving no HARQ feedback for the data packet from the second terminal device, sending the NACK to the resource scheduling device.

9. The apparatus according to claim 8, wherein, when executed, the instructions cause the apparatus to perform operations comprising:

notifying the resource scheduling device of the HARQ feedback by said forwarding the ACK or said sending the NACK via uplink control information (UCI).

10. The apparatus according to claim 7, wherein the first resource is determined according to an identifier of the second terminal device in groupcast communication and the time domain location of the SCI.

11. An apparatus, applied to a second terminal device, comprising:

at least one processor, and a memory storing instructions for execution by the at least one processor;

wherein, when executed, the instructions cause the apparatus to perform operations comprising:

receiving a data packet and sidelink control information (SCI) from a first terminal device over a sidelink (SL) which is a wireless communication link between the first terminal device and the second terminal device, wherein the data packet is an initially transmitted data packet, wherein the SCI comprises an identifier of a hybrid automatic repeat request (HARQ) process, an identifier of the first terminal device and an identifier of the second terminal device;

selecting an idle HARQ process to associate the identifier of the first terminal device, the identifier of the HARQ process, and the identifier of the second terminal device; and using the selected idle HARQ process as a HARQ process for processing current transmission.

12. The apparatus according to claim 11, wherein, when executed, the instructions cause the apparatus to perform operations comprising:

sending a HARQ feedback for the data packet in accordance with the selected idle HARQ process, to the first terminal device or a resource scheduling device.

\* \* \* \* \*